(12) United States Patent
Yoon et al.

(10) Patent No.: US 10,884,412 B2
(45) Date of Patent: Jan. 5, 2021

(54) AUTONOMOUS VEHICLE AND METHOD OF CONTROLLING THE SAME

(71) Applicant: LG Electronics Inc., Seoul (KR)

(72) Inventors: Sangyol Yoon, Seoul (KR); Heedong Choi, Seoul (KR); Daegeun Ha, Seoul (KR)

(73) Assignee: LG Electronics Inc., Seoul (KR)

( * ) Notice: Subject to any disclaimer, the term of this patent is extended or adjusted under 35 U.S.C. 154(b) by 109 days.

(21) Appl. No.: 16/206,929

(22) Filed: Nov. 30, 2018

(65) Prior Publication Data

US 2019/0163186 A1 May 30, 2019

(30) Foreign Application Priority Data

Nov. 30, 2017 (KR) .................. 10-2017-0162614

(51) Int. Cl.
*G05D 1/00* (2006.01)
*G05D 1/02* (2020.01)
(Continued)

(52) U.S. Cl.
CPC .......... *G05D 1/0088* (2013.01); *B60W 30/00* (2013.01); *B62D 1/00* (2013.01); *B62D 15/0285* (2013.01); *G05D 1/0038* (2013.01); *G05D 1/0214* (2013.01); *G05D 1/0223* (2013.01); *G08C 17/00* (2013.01); *G08C 17/02* (2013.01); *G01S 13/931* (2013.01); *G01S 15/931* (2013.01); *G01S 17/931* (2020.01); *G01S 2013/9314* (2013.01);
(Continued)

(58) Field of Classification Search
None
See application file for complete search history.

(56) References Cited

U.S. PATENT DOCUMENTS 7,676,310 B2 * 3/2010 Klein .................. B62D 5/046
116/31
8,831,813 B1 * 9/2014 Ferguson ............. B60T 7/042
701/23

(Continued)

FOREIGN PATENT DOCUMENTS

EP 2523062 11/2012
EP 3104244 12/2016

(Continued)

OTHER PUBLICATIONS

Extended European Search Report in European Application No. 18208817.9, dated Aug. 19, 2019, 18 pages.

(Continued)

*Primary Examiner* — Kenny S Lin
(74) *Attorney, Agent, or Firm* — Fish & Richardson P.C.

(57) ABSTRACT

An autonomous vehicle include an object detection device configured to detect external information about the autonomous vehicle, a communication device configured to receive user information from a remote device, and one or more processors. The one or more processors are configured to: determine internal information about the autonomous vehicle; change control of the autonomous vehicle based on at least one of the external information, the user information, or the internal information; and transmit, to the remote device, monitoring information corresponding to the changed control of the autonomous vehicle.

15 Claims, 19 Drawing Sheets

(51) Int. Cl.
  *G08C 17/02* (2006.01)
  *B60W 30/00* (2006.01)
  *B62D 15/02* (2006.01)
  *G08C 17/00* (2006.01)
  *B62D 1/00* (2006.01)
  *G01S 13/931* (2020.01)
  *G01S 15/931* (2020.01)
  *G01S 17/931* (2020.01)

(52) U.S. Cl.
  CPC ............. *G01S 2015/932* (2013.01); *G05D 2201/0213* (2013.01)

(56) References Cited

U.S. PATENT DOCUMENTS

| | | | |
|---|---|---|---|
| 10,083,547 B1* | 9/2018 | Tomatsu | G02B 27/0101 |
| 2007/0198145 A1* | 8/2007 | Norris | G05D 1/021 |
| | | | 701/23 |
| 2009/0309970 A1 | 12/2009 | Ishii et al. | |
| 2010/0292886 A1* | 11/2010 | Szczerba | G01S 13/723 |
| | | | 701/31.4 |
| 2014/0121883 A1* | 5/2014 | Shen | B62D 15/0285 |
| | | | 701/28 |
| 2015/0166059 A1* | 6/2015 | Ko | B60T 7/22 |
| | | | 701/28 |
| 2015/0344028 A1* | 12/2015 | Gieseke | B62D 15/028 |
| | | | 701/1 |
| 2016/0209840 A1* | 7/2016 | Kim | G05D 1/0061 |
| 2017/0229020 A1* | 8/2017 | Colella | B60W 10/20 |
| 2017/0336629 A1* | 11/2017 | Suzuki | G05D 1/0088 |
| 2018/0043884 A1* | 2/2018 | Johnson | B62D 15/0285 |
| 2018/0072321 A1* | 3/2018 | Mueller | B60W 50/16 |
| 2018/0137373 A1* | 5/2018 | Rasmusson, Jr. | G05D 1/0088 |
| 2018/0147988 A1* | 5/2018 | Lee | G08G 1/0133 |
| 2018/0157036 A1* | 6/2018 | Choi | G02B 27/0179 |
| 2018/0162384 A1* | 6/2018 | Kim | B62D 15/0285 |
| 2018/0178786 A1* | 6/2018 | Takaki | G08G 1/166 |
| 2018/0357484 A1* | 12/2018 | Omata | G06K 9/00818 |

FOREIGN PATENT DOCUMENTS

| | | |
|---|---|---|
| JP | 2006113858 | 4/2006 |
| JP | 2007310698 | 11/2007 |
| JP | 2014065392 | 4/2014 |
| JP | 2014071776 | 4/2014 |
| JP | 2016529767 | 9/2016 |
| JP | 2017182568 | 10/2017 |
| KR | 1020170037985 | 4/2017 |

OTHER PUBLICATIONS

Partial European Search Report in European Application No. 18208817.9, dated May 6, 2019, 16 pages.

* cited by examiner

AUTONOMOUS VEHICLE AND METHOD OF CONTROLLING THE SAME

CROSS-REFERENCE TO RELATED APPLICATIONS

This application claims the benefit of Korean Patent Application No. 10-2017-0162614, filed on Nov. 30, 2017, which is hereby incorporated by reference as if fully set forth herein.

FIELD

The present disclosure relates generally to an autonomous vehicle and a method of controlling the same, and more particularly, to a method of monitoring an autonomous vehicle.

BACKGROUND

A vehicle is an apparatus that can transport a user riding therein in a desired direction. One example of the vehicle is an automobile.

In some examples, vehicles may be equipped with sensors and electronic devices to provide user convenience. For example, research has been actively conducted on an advanced driver assistance system (ADAS) to provide user convenience for various operations in driving. Further, autonomous vehicles are under active development.

In some cases where an autonomous vehicle operates apart from a user during parking, the user may be difficult to perceive the surroundings of the vehicle. It is of interest to develop techniques for monitoring a parking process of an autonomous vehicle through a remote device to reduce danger of accident in the parking process.

In some cases, the remote vehicle monitoring techniques may provide information about the current location of an autonomous vehicle, information about a target parking location, or simple image information unconditionally, without monitoring information suitable for the current situation of the autonomous vehicle.

SUMMARY

The present disclosure describes an autonomous vehicle and a method for the autonomous vehicle to generate monitoring information suitable for the current situation of an autonomous vehicle based on at least one of external information such as information about an obstacle detected around the autonomous vehicle, user information about a remote device, or internal information related to a function of the autonomous vehicle, and provide the generated monitoring information to the remote device.

According to one aspect of the subject matter described in this application, an autonomous vehicle include an object detection device configured to detect external information about the autonomous vehicle, a communication device configured to receive user information from a remote device, and one or more processors. The one or more processors are configured to: determine internal information about the autonomous vehicle; change control of the autonomous vehicle based on at least one of the external information, the user information, or the internal information; and transmit, to the remote device, monitoring information corresponding to the changed control of the autonomous vehicle.

Implementations according to this aspect may include one or more of the following features. For example, the external information may include information about an obstacle around the autonomous vehicle detected through the object detection device, where the one or more processors may be further configured to: change control of the autonomous vehicle to control the autonomous vehicle to avoid the obstacle; determine a viewpoint or a screen scale based on the changed control of the autonomous vehicle to control the autonomous vehicle to avoid the obstacle; and generate the monitoring information including the viewpoint or the screen scale. In some implementations, the one or more processors may be further configured to: determine at least one of a viewpoint change speed, a viewpoint change time, or a screen scale change speed based on at least one of a distance from the autonomous vehicle to the obstacle, a deceleration duration, or a deceleration amount; and generate the monitoring information that includes at least one of the viewpoint change speed, the viewpoint change time, or the screen scale change speed.

In some implementations, the one or more processors may be further configured to, based on the obstacle existing in a driving route of the autonomous vehicle: generate an avoidance route that allows the autonomous vehicle to avoid the obstacle; and generate the monitoring information including the avoidance route and the driving route to cause the avoidance route and the driving route to be displayed together on the remote device. In some examples, the user information may include one of (i) first information indicating that a user of the remote device is not watching the remote device, or (ii) second information indicating that the user of the remote device is watching the remote device. In some examples, the one or more processors may be further configured to, in response to receipt of the first information through the communication device, change control of the autonomous vehicle based on the received first information to cease an operation of the autonomous vehicle at a current location of the autonomous vehicle.

In some implementations, the one or more processors may be further configured to receive a control value for controlling an operation of the autonomous vehicle from the remote device through the communication device. In some cases, the one or more processors may be further configured to, in response to receipt of the first information through the communication device, not apply the control value in control of the autonomous vehicle. In some examples, the one or more processors may be further configured to: in response to receipt of the first information, set a first reference to control the autonomous vehicle to avoid the obstacle; and in response to receipt of the second information, set a second reference to control the autonomous vehicle to avoid the obstacle, the second reference being different from the first reference.

In some implementations, the one or more processors may be further configured to, based on a collision between the autonomous vehicle and the obstacle, store, in a memory, information including a collision time and user information received from the remote device at the collision time. In some examples, the one or more processors may be further configured to: receive, from at least one external device through the communication device, information configured to control an operation of the autonomous vehicle; set priority levels of the remote device and the at least one external device, respectively, based on receiving the first information or the second information; and prioritize control of the autonomous vehicle based on the priority levels, where the priority levels are set differently based on whether the one or more processors receive the first information or the second information.

In some implementations, the one or more processors may be further configured to, based on receiving the first information for a duration greater than or equal to a predetermined time through the communication device: control the autonomous vehicle to stop at a current location of the autonomous vehicle; or control the autonomous vehicle to return to a location from which the user has started the autonomous vehicle. In some examples, the one or more processors may be further configured to: receive a first value for controlling a speed of the autonomous vehicle from the remote device through the communication device; calculate a second control value from the received first control value based on a screen scale included in the monitoring information; and control the autonomous vehicle based on the calculated second control value.

In some implementations, the internal information may include information about a driving mode configured to control driving of the autonomous vehicle in a parking lot, and information about a parking mode configured to control parking of the autonomous vehicle in a parking space and pulling-out of the autonomous vehicle from the parking space, where the one or more processors may be further configured to control the autonomous vehicle to operate in one of the driving mode or the parking mode. In some examples, the one or more processors may be further configured to: before receiving, from the remote device through the communication device, a signal requesting the autonomous vehicle to start to move, generate first monitoring information including a current location of the autonomous vehicle, a location of a target parking space, and a driving route from the current location of the autonomous vehicle to the target parking space; and after receiving, from the remote device through the communication device, the signal requesting the autonomous vehicle to start to move, generate second monitoring information including a viewpoint and a screen scale that are different from a viewpoint and a screen scale included in the first monitoring information.

According to another aspect, a method of controlling an autonomous vehicle includes detecting external information about the autonomous vehicle, receiving user information from a remote device, determining internal information about the autonomous vehicle, changing control of the autonomous vehicle based on at least one of the external information, the user information, or the internal information, and transmitting, to the remote device, monitoring information corresponding to the changed control of the autonomous vehicle.

Implementations according to this aspect may include one or more of the following features. For examples, the external information may include information about an obstacle around the autonomous vehicle, where changing control of the autonomous vehicle may include changing control of the autonomous vehicle to control the autonomous vehicle to avoid the obstacle. The method may further include determining a viewpoint or a screen scale based on the changed control of the autonomous vehicle to control the autonomous vehicle to avoid the obstacle, and generating the monitoring information including the viewpoint or the screen scale.

In some implementations, the user information may include one of (i) first information indicating that a user of the remote device is not watching the remote device, or (ii) second information indicating that the user of the remote device is watching the remote device. In some examples, the method may further include: in response to receipt of the first information, setting a first reference to control the autonomous vehicle to avoid the obstacle; and in response to receipt of the second information, setting a second reference to control the autonomous vehicle to avoid the obstacle, the second reference being different from the first reference.

In some implementations, the internal information may include information about a driving mode configured to control driving of the autonomous vehicle in a parking lot, and information about a parking mode configured to control parking of the autonomous vehicle in a parking space and pulling-out of the autonomous vehicle from the parking space, where changing control of the autonomous vehicle includes switching control of the autonomous vehicle between the driving mode and the parking mode.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

A vehicle as described in this specification may include, but not be limited to, an automobile and a motorcycle. Hereinafter, a description will be given based on an automobile.

A vehicle as described in this specification may include one or more of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

Figure 1:
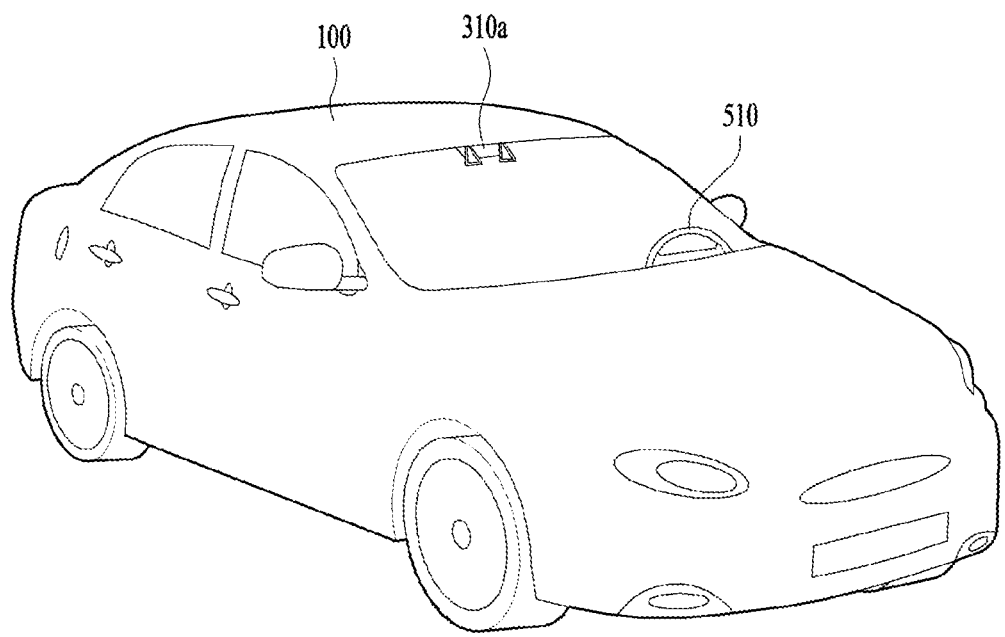
FIG. 1 is a view illustrating an external appearance of an example vehicle.
Figure 1:
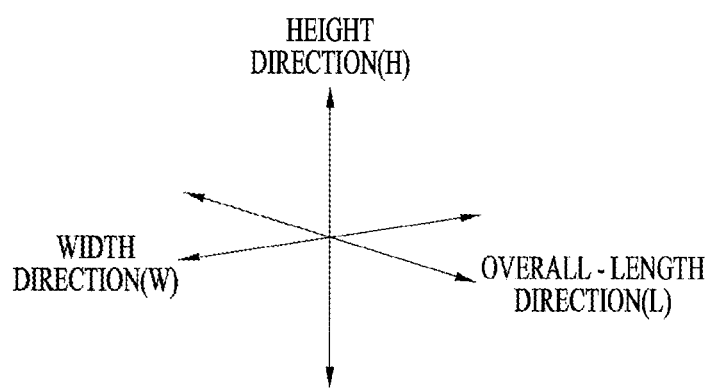
Figure 2A:
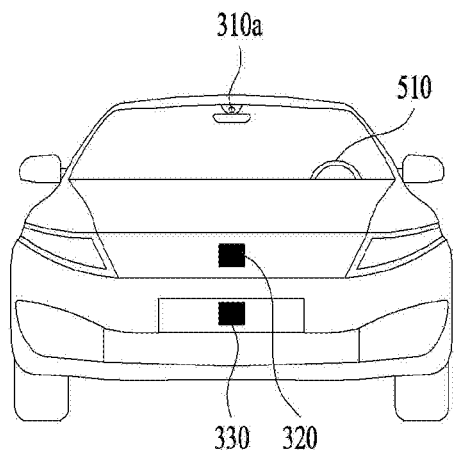
FIGS. 2A, 2B, and 2C are different angled views of the external appearance of the example vehicle.
Figure 2C:
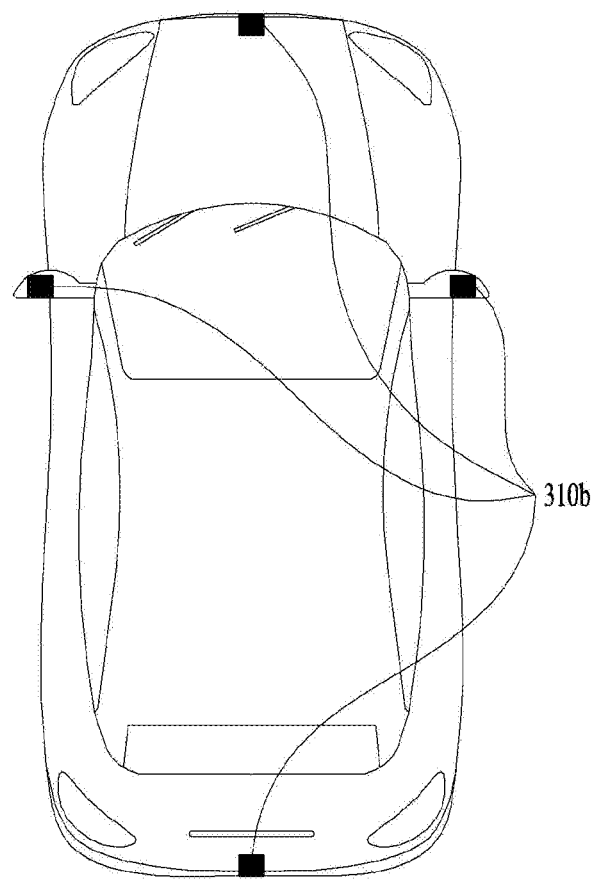
Figure 2B:
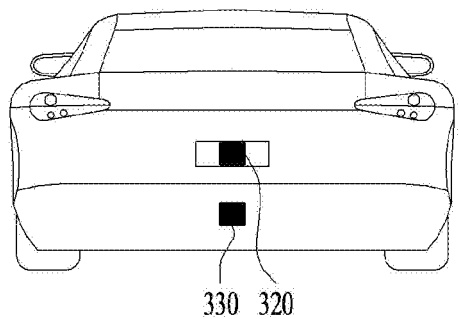
Figure 3:
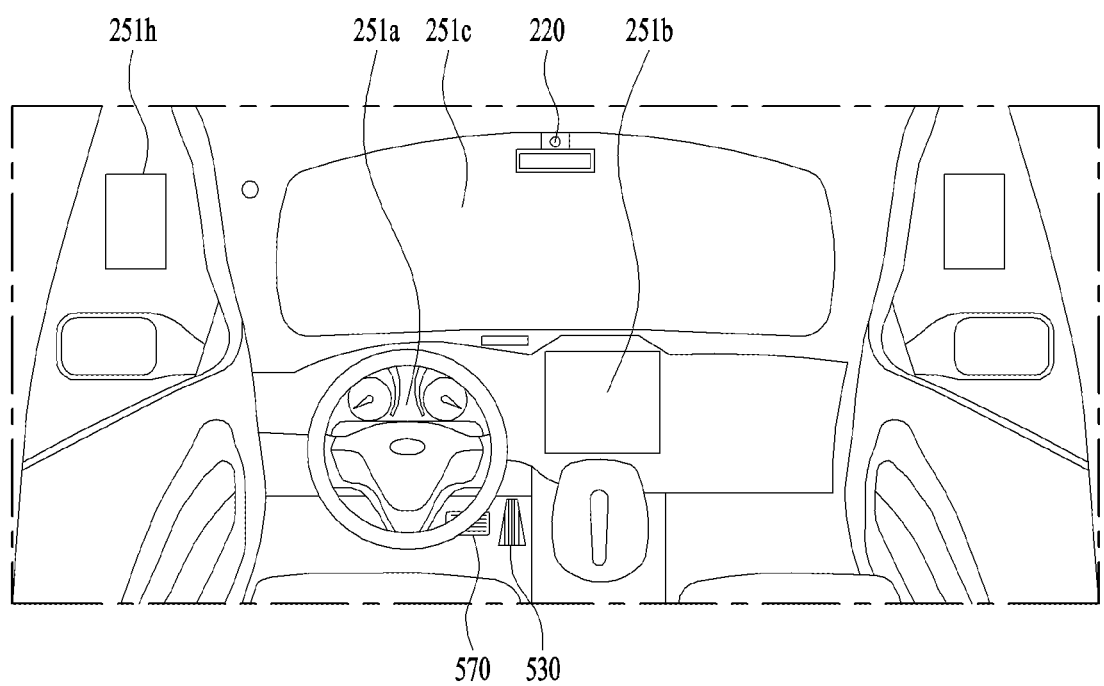
FIGS. 3 and 4 are views illustrating an example interior configuration of an example vehicle.
Figure 4:
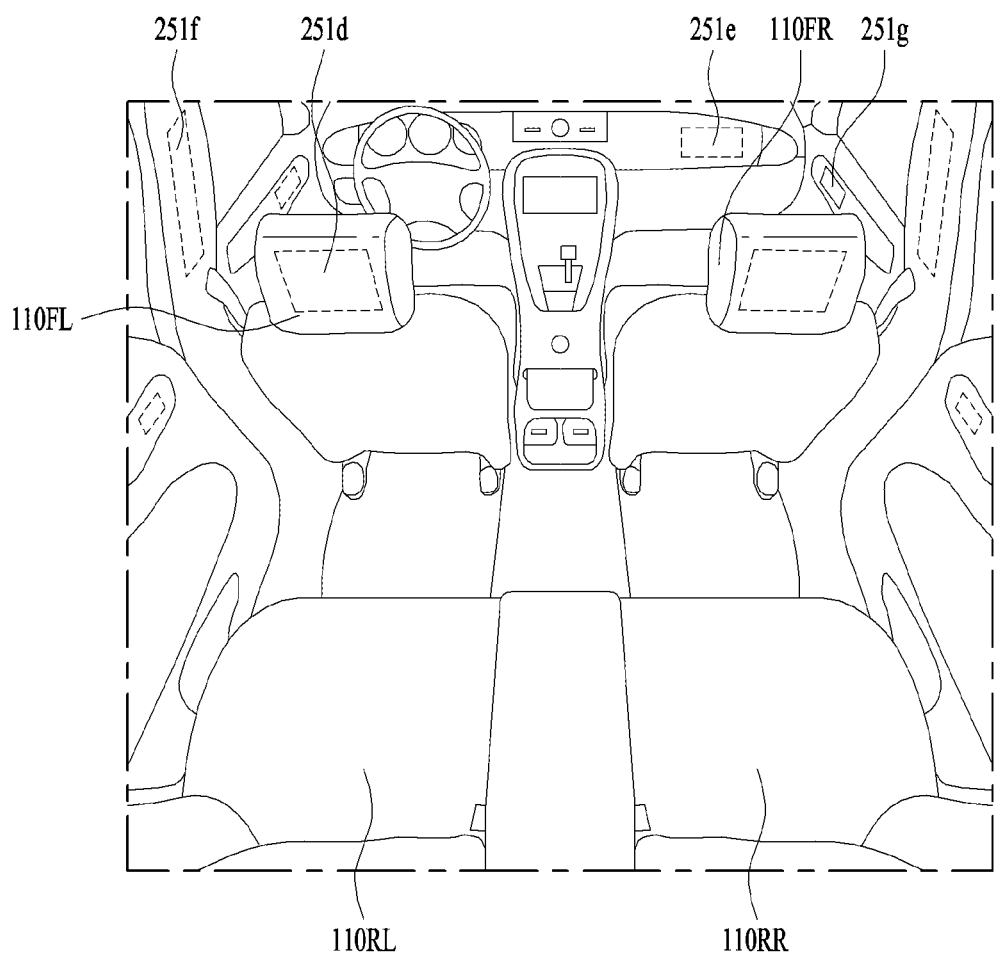

FIG. 1 is a view of an example external appearance of an example vehicle, FIGS. 2A, 2B, and 2C show different angled views of an example vehicle, FIGS. 3 and 4 show an example internal configuration of an example vehicle, FIGS.

Figure 7:
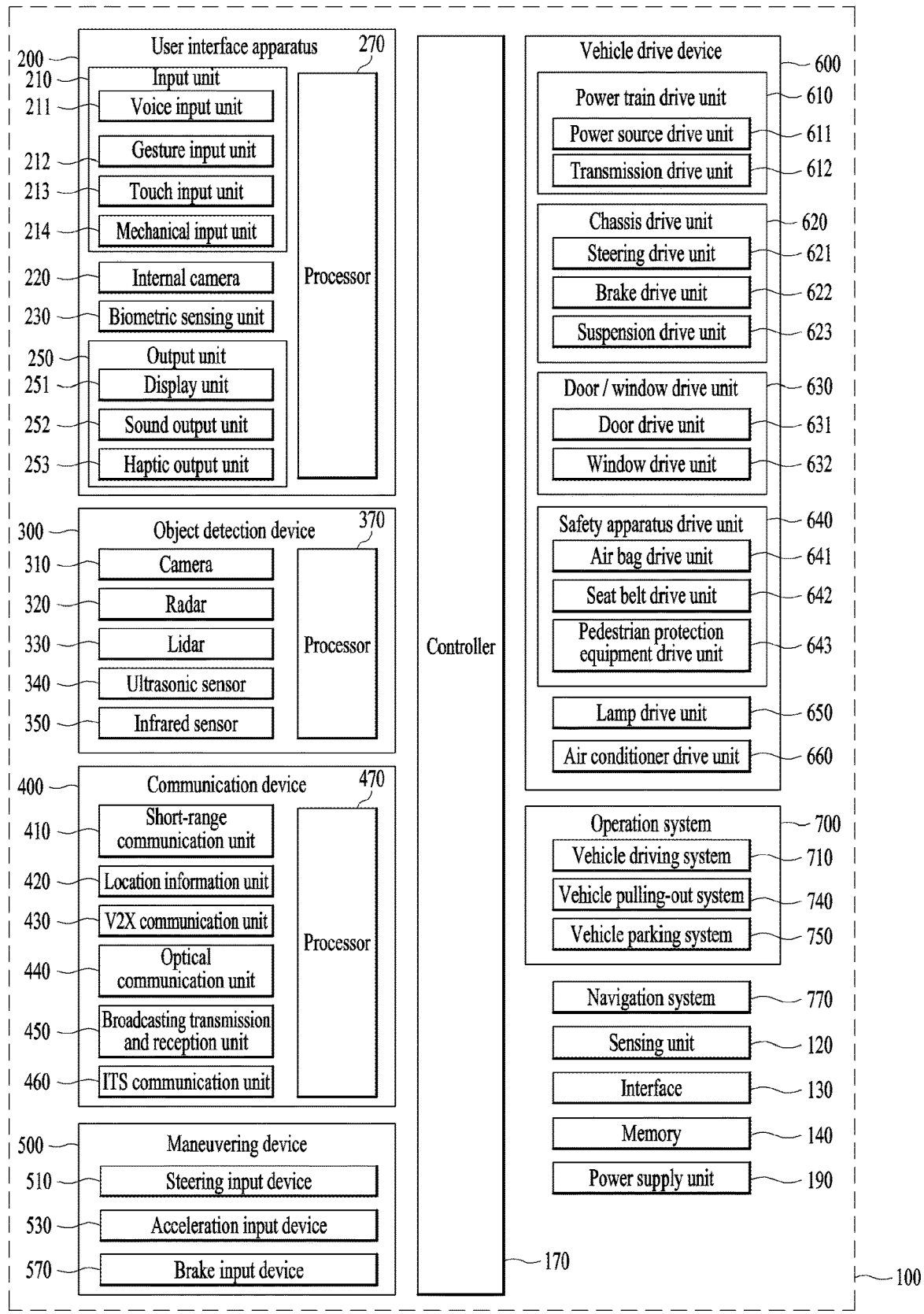
FIG. 7 is a block diagram illustrating an example vehicle.

5 and 6 illustrate example objects around an example vehicle, and FIG. 7 is a block diagram illustrating an example vehicle.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle.

The vehicle 100 may be switched to an autonomous mode or a manual mode in response to a user input.

For example, in response to a user input received through a user interface device 200, the vehicle 100 may be switched from a manual mode to an autonomous mode, or vice versa.

The vehicle 100 may be switched to the autonomous mode or to the manual mode based on driving environment information.

The driving environment information may include at least one of the following: information on an object outside a vehicle, navigation information, or vehicle state information.

For example, the vehicle 100 may be switched from the manual mode to the autonomous mode, or vice versa, based on driving environment information generated by the object detection device 300.

In another example, the vehicle 100 may be switched from the manual mode to the autonomous mode, or vice versa, based on driving environment information received through a communication device 400.

The vehicle 100 may be switched from the manual mode to the autonomous mode, or vice versa, based on information, data, and a signal provided from an external device.

When the vehicle 100 operates in the autonomous mode, the autonomous vehicle 100 may operate based on an operation system 700.

For example, the autonomous vehicle 100 may operate based on information, data, or signals generated by a driving system 710, a vehicle pulling-out system 740, and a vehicle parking system 750.

While operating in the manual mode, the autonomous vehicle 100 may receive a user input for driving of the vehicle 100 through a maneuvering device 500. In response to the user input received through the maneuvering device 500, the vehicle 100 may operate.

As used herein, the term "overall length" is the length from the front end to the rear end of the vehicle 100, the term "overall width" is the width of the vehicle 100, and the term "overall height" is the height from the bottom of the wheel to the roof. In the following description, the term "overall length direction L" may be the reference direction for the measurement of the overall length of the vehicle 100, the term "overall width direction W" may be the reference direction for the measurement of the overall width of the vehicle 100, and the term "overall height direction H" may be the reference direction for the measurement of the overall height of the vehicle 100.

As illustrated in FIG. 7, the vehicle 100 may include the user interface device 200, the object detection device 300, the communication device 400, the maneuvering device 500, a vehicle drive device 600, the operation system 700, a navigation system 770, a sensing unit 120, an interface 130, a memory 140, a controller 170, and a power supply unit 190. The vehicle 100 may include one or more processors. In some implementations, the individual devices such as the user interface device 200, the object detection device 300, and the communication device 400 may include one or more processors. In some implementations, the controller 170 may include one or more processors.

In some implementations, the vehicle 100 may further include other components in addition to the aforementioned components, or may not include some of the aforementioned components.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, outside illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle condition information may be information that is generated based on data sensed by a variety of sensors inside a vehicle.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

In some implementations, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be provided as an element of the controller 170.

The controller 170 may control the overall operation of each unit inside the vehicle 100. The controller 170 may be referred to as an Electronic Controller (ECU).

The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Further, each of the sensing unit 120, the interface 130, the memory 140, the power supply unit 190, the user interface device 200, the object detection device 300, the communication device 400, the maneuvering device 500, the vehicle drive device 600, the operation system 700, and the navigation system 770 may have an individual processor or may be incorporated in the controller 170.

The user interface device 200 is provided to support communication between the vehicle 100 and a user. The user interface device 200 may receive a user input, and provide information generated in the vehicle 100 to the user. The vehicle 100 may enable User Interfaces (UI) or User Experience (UX) through the user interface device 200.

The user interface device 200 may include an input unit 210, an internal camera 220, a biometric sensing unit 230, an output unit 250, and a processor 270. Each component of the user interface device 200 may be separated from or integrated with the afore-described interface 130, structurally or operatively.

In some implementations, the user interface device 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some implementations, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense the 3D gesture input by employing a time of flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some implementations, the touch input unit 213 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The processor 270 may start a learning mode of the vehicle 100 in response to a user input to at least one of the afore-described voice input unit 211, gesture input unit 212, touch input unit 213, or mechanical input unit 214. In the learning mode, the vehicle 100 may learn a driving route and ambient environment of the vehicle 100. The learning mode will be described later in detail in relation to the object detection device 300 and the operation system 700.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some implementations, the user interface device 200 may include a plurality of display units 251*a* to 251*g*.

The display unit 251 may be disposed in a region of a steering wheel, a region 251*a*, 251*b* or 251*e* of an instrument panel, a region 251*d* of a seat, a region 251*f* of each pillar, a region 251*g* of a door, a region of a center console, a region of a head lining, a region of a sun visor, a region 251*c* of a windshield, or a region 251*h* of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface device 200.

In some implementations, the user interface device 200 may include a plurality of processors 270 or may not include the processor 270.

In a case where the user interface device 200 does not include the processor 270, the user interface device 200 may operate under control of the controller 170 or a processor of a different device inside the vehicle 100.

In some implementations, the user interface device 200 may be referred to as a display device for a vehicle.

The user interface device 200 may operate under control of the controller 170.

The object detection device 300 is used to detect an object outside the vehicle 100. The object detection device 300 may generate object information based on sensing data.

The object information may include information about the presence of an object, location information of the object, information on distance between the vehicle and the object, and the speed of the object relative to the vehicle 100.

The object may include various objects related to travelling of the vehicle 100.

Figure 5:
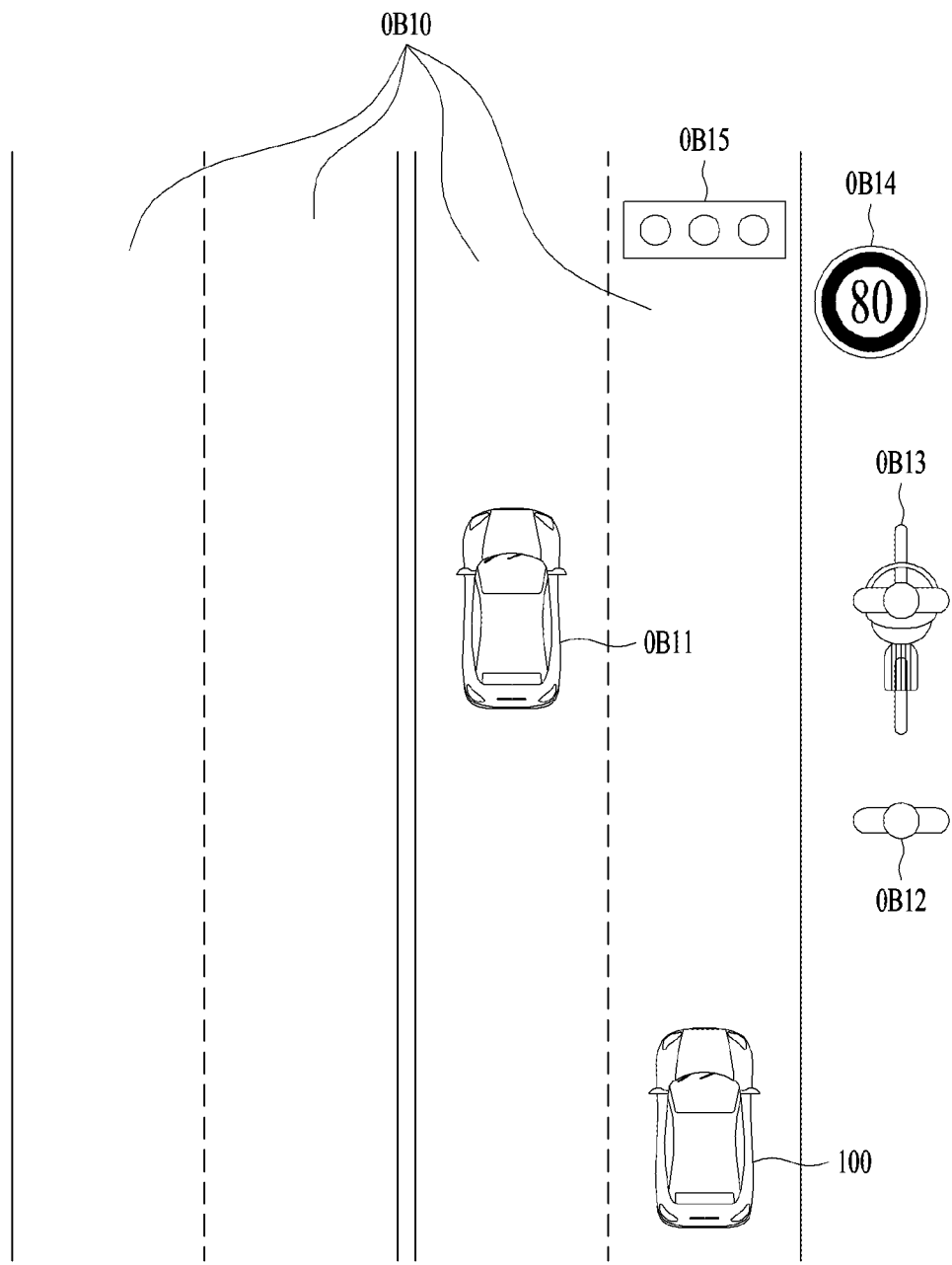
FIGS. 5 and 6 are views illustrating example objects around an example vehicle.
Figure 6:
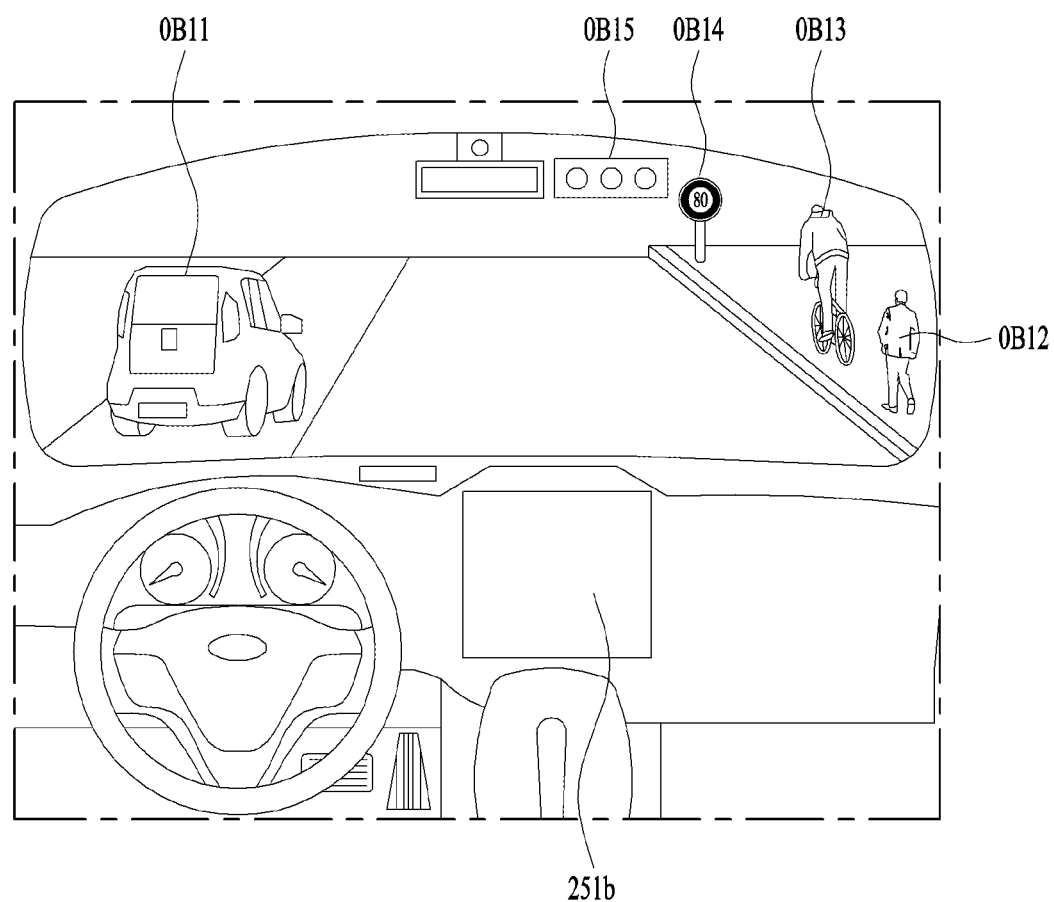

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling (hereinafter, referred to as the current driving lane), a lane next to the current driving lane, and a lane in which a vehicle travelling in the opposite direction is travelling. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic light, and a bridge.

The geographical feature may include a mountain and a hill.

In some implementations, the object may be classified as a movable object or a stationary object. For example, the movable object may include a nearby vehicle and a pedestrian. For example, the stationary object may include a traffic signal, a road, and a structure.

The object detection device 300 may include a camera 310, a radar 320, a lidar 330, an ultrasonic sensor 340, an infrared sensor 350, and a processor 370. Each component of the object detection device may be separated from or integrated with the sensing unit, structurally or operatively.

In some implementations, the object detection device 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310*a*, an around view monitoring (AVM) camera 310*b*, or a 360-degree camera.

Using various image processing algorithms, the camera 310 may acquire location information of an object, information on distance to the object, and information on speed relative to the object.

For example, based on change in size over time of an object in acquired images, the camera 310 may acquire information on distance to the object and information on speed relative to the object.

For example, the camera 310 may acquire the information on distance to the object and the information on speed relative to the object by utilizing a pin hole model or by profiling a road surface.

For example, the camera 310 may acquire the information on distance to the object and the information on the speed relative to the object, based on information on disparity of stereo images acquired by a stereo camera 310*a*.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object.

The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 330 may rotate by a motor and detect an object in the vicinity of the vehicle 100.

When implemented as the non-drive type lidar, the lidar 330 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 350 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection device 300.

The processor 370 may detect or classify an object by comparing data sensed by the camera 310, the radar 320, the lidar 330, the ultrasonic sensor 340, and the infrared sensor 350 with pre-stored data.

The processor 370 may detect and track an object based on acquired images. The processor 370 may, for example, calculate the distance to the object and the speed relative to the object.

For example, the processor 370 may acquire information on the distance to the object and information on the speed relative to the object based on a variation in size over time of the object in acquired images.

In another example, the processor 370 may acquire information on the distance to the object or information on the speed relative to the object by employing a pin hole model or by profiling a road surface.

In yet another example, the processor 370 may acquire information on the distance to the object and information on the speed relative to the object based on information on disparity of stereo images acquired from the stereo camera 310a.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

As described before, once the vehicle 100 starts the learning mode in response to a user input to the input unit 210, the processor 370 may store data sensed by the camera 310, the radar 320, the lidar 330, the ultrasonic sensor 340, and the infrared sensor 350 in the memory 140.

Each step of the learning mode based on analysis of stored data, and an operating mode following the learning mode will be described later in detail in relation to the operation system 700. According to an implementation, the object detection device 300 may include a plurality of processors 370 or no processor 370. For example, the camera 310, the radar 320, the lidar 330, the ultrasonic sensor 340, and the infrared sensor 350 may include individual processors.

In a case where the object detection device 300 does not include the processor 370, the object detection device 300 may operate under control of the controller 170 or a processor inside the vehicle 100.

The object detection device 300 may operate under control of the controller 170.

The communication device 400 is configured to perform communication with an external device. Here, the external device may be a nearby vehicle, a mobile terminal, or a server.

To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470.

In some implementations, the communication device 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

The processor 470 may control the overall operation of each unit of the communication device 400.

In some implementations, the communication device 400 may include a plurality of processors 470, or may not include the processor 470.

In a case where the communication device 400 does not include the processor 470, the communication device 400 may operate under control of the controller 170 or a processor of a device inside of the vehicle 100.

In some implementations, the communication device 400 may implement a vehicle display device, together with the user interface device 200. In this case, the vehicle display device may be referred to as a telematics device or an audio video navigation (AVN) device.

The communication device 400 may operate under control of the controller 170.

The maneuvering device 500 is configured to receive a user input for driving the vehicle 100.

In the manual mode, the vehicle 100 may operate based on a signal provided by the maneuvering device 500.

The maneuvering device 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some implementations, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some implementations, the acceleration input device or the break input device may be configured as a touch screen, a touch pad, or a button.

The maneuvering device 500 may operate under control of the controller 170.

The vehicle drive device 600 is configured to electrically control the operation of various devices of the vehicle 100.

The vehicle drive device 600 may include a power train drive unit 610, a chassis drive unit 620, a door/window drive unit 630, a safety apparatus drive unit 640, a lamp drive unit 650, and an air conditioner drive unit 660.

In some implementations, the vehicle drive device 600 may further include other components in addition to the aforementioned components, or may not include some of the aforementioned components.

In some implementations, the vehicle drive device 600 may include a processor. Each unit of the vehicle drive device 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In a case where an electric motor is the power source, the power source drive unit 611 may control the motor. The power train drive unit 610 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

In some implementations, in a case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some implementations, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some implementations, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive device 600 may include a processor. Each unit of the vehicle drive device 600 may include its own processor.

The vehicle drive device 600 may operate under control of the controller 170.

The operation system 700 is a system for controlling the overall driving operation of the vehicle 100. The operation system 700 may operate in the autonomous driving mode.

The operation system 700 may include the driving system 710, the vehicle pulling-out system 740, and the vehicle parking system 750.

In some implementations, the operation system 700 may further include other components in addition to the aforementioned components, or may not include some of the aforementioned component.

In some implementations, the operation system 700 may include a processor. Each unit of the operation system 700 may include its own processor.

In some implementations, the operation system 700 may control driving in the autonomous mode based on learning. In this case, the learning mode and an operating mode based on the premise of completion of learning may be performed. A description will be given below of a method of executing the learning mode and the operating mode by the processor of the operation system 700.

The learning mode may be performed in the aforedescribed manual mode. In the learning mode, the processor of the operation system 700 may learn a driving route and ambient environment of the vehicle 100.

The learning of the driving route may include generating map data for a route in which the vehicle 100 drives. Particularly, the processor of the operation system 700 may generate map data based on information detected through the object detection device 300 during driving from a departure to a destination.

The learning of the ambient environment may include storing and analyzing information about an ambient environment of the vehicle 100 during driving and parking.

Particularly, the processor of the operation system 700 may store and analyze the information about the ambient environment of the vehicle based on information detected through the object detection device 300 during parking of the vehicle 100, for example, information about a location, size, and a fixed (or mobile) obstacle of a parking space.

The operating mode may be performed in the aforedescribed autonomous mode. The operating mode will be described based on the premise that the driving route or the ambient environment has been learned in the learning mode.

The operating mode may be performed in response to a user input through the input unit 210, or when the vehicle 100 reaches the learned driving route and parking space, the operating mode may be performed automatically.

The operating mode may include a semi-autonomous operating mode requiring some user's manipulations of the maneuvering device 500, and a full autonomous operating mode requiring no user's manipulation of the maneuvering device 500.

In some implementations, the processor of the operation system 700 may drive the vehicle 100 along the learned driving route by controlling the driving system 710 in the operating mode.

In some implementations, the processor of the operation system 700 may pull out the vehicle 100 from the learned parking space by controlling the vehicle pulling-out system 740 in the operating mode.

In some implementations, the processor of the operation system 700 may park the vehicle 100 in the learned parking space by controlling the vehicle parking system 750 in the operating mode. In some implementations, in a case where the operation system 700 is implemented as software, the operation system 700 may be a subordinate concept of the controller 170.

In some implementations, the operation system 700 may be a concept including at least one selected from among the user interface device 200, the object detection device 300, the communication device 400, the vehicle drive device 600, and the controller 170.

The driving system 710 may perform driving of the vehicle 100.

The driving system 710 may perform driving of the vehicle 100 by providing a control signal to the vehicle drive device 600 in response to reception of navigation information from the navigation system 770.

The driving system 710 may perform driving of the vehicle 100 by providing a control signal to the vehicle drive device 600 in response to reception of object information from the object detection device 300.

The driving system 710 may perform driving of the vehicle 100 by providing a control signal to the vehicle drive device 600 in response to reception of a signal from an external device through the communication device 400.

In some implementations, the driving system 710 may be a system that drives the vehicle 100, including at least one of the user interface device 200, the object detection device 300, the communication device 400, the maneuvering device 500, the vehicle drive device 600, the navigation system 770, the sensing unit 120, or the controller 170.

The driving system 710 may be referred to as a vehicle driving control device.

The vehicle pulling-out system 740 may perform an operation of pulling the vehicle 100 out of a parking space.

The vehicle pulling-out system 740 may perform an operation of pulling the vehicle 100 out of a parking space, by providing a control signal to the vehicle drive device 600 in response to reception of navigation information from the navigation system 770.

The vehicle pulling-out system 740 may perform an operation of pulling the vehicle 100 out of a parking space, by providing a control signal to the vehicle drive device 600 in response to reception of object information from the object detection device 300.

The vehicle pulling-out system 740 may perform an operation of pulling the vehicle 100 out of a parking space, by providing a control signal to the vehicle drive device 600 in response to reception of a signal from an external device.

In some implementations, the vehicle pulling-out system 740 may be a system that performs pulling-out of the vehicle 100, including at least one of the user interface device 200, the object detection device 300, the communication device 400, the maneuvering device 500, the vehicle drive device 600, the navigation system 770, the sensing unit 120, or the controller 170.

The vehicle pulling-out system 740 may be referred to as a vehicle pulling-out control device.

The vehicle parking system 750 may perform an operation of parking the vehicle 100 in a parking space.

The vehicle parking system 750 may perform an operation of parking the vehicle 100 in a parking space, by providing a control signal to the vehicle drive device 600 in response to reception of navigation information from the navigation system 770.

The vehicle parking system 750 may perform an operation of parking the vehicle 100 in a parking space, by providing a control signal to the vehicle drive device 600 in response to reception of object information from the object detection device 300.

The vehicle parking system 750 may perform an operation of parking the vehicle 100 in a parking space, by providing a control signal to the vehicle drive device 600 in response to reception of a signal from an external device.

In some implementations, the vehicle parking system 750 may be a system that performs parking of the vehicle 100, including at least one of the user interface device 200, the object detection device 300, the communication device 400, the maneuvering device 500, the vehicle drive device 600, the navigation system 770, the sensing unit 120, or the controller 170.

The vehicle parking system 750 may be referred to as a vehicle parking control device.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some implementations, the navigation system 770 may update pre-stored information by receiving information from an external device through the communication device 400.

In some implementations, the navigation system 770 may be classified as an element of the user interface device 200.

Now, a description will be given of external information about an autonomous vehicle, user information, and internal information about the autonomous vehicle and control of the autonomous vehicle based on each information. Further, a process of generating monitoring information by reflecting changed control of an autonomous vehicle will be described. Further, a process of transmitting the generated monitoring information to a remote device and displaying the monitoring information on the remote device will be described.

Figure 8:
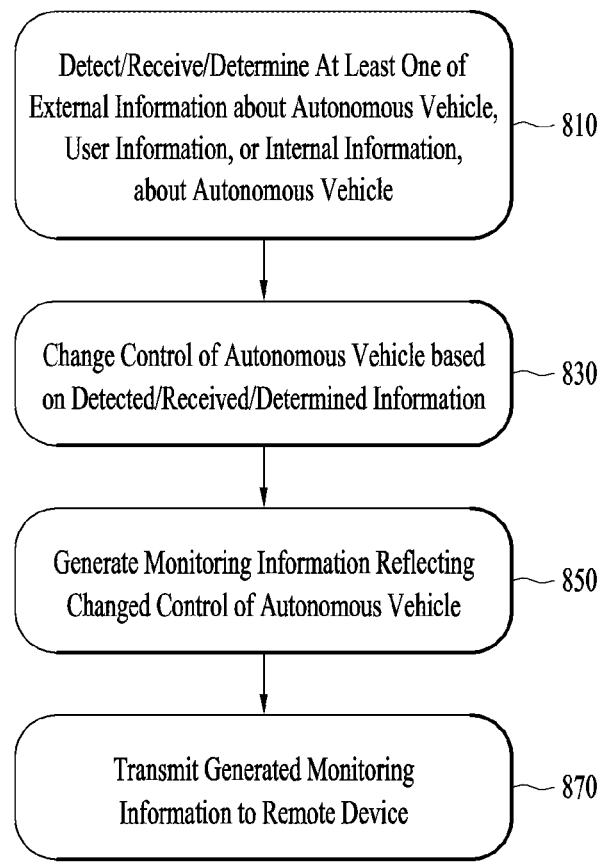
FIG. 8 is a flowchart illustrating an example method for monitoring an example autonomous vehicle.

FIG. 8 is a flowchart illustrating an example method for monitoring an autonomous vehicle. Herein, it may be understood that the processor of the vehicle 100 is a component corresponding to the controller 170 illustrated in FIG. 7. Further, the vehicle 100 and the autonomous vehicle 100 may be understood as identical.

The processor of the vehicle 100 determines at least one of external information about the vehicle 100, user information, or internal information about the vehicle 100 in step 810 of FIG. 8. First, external information about the vehicle 100, user information, and internal information about the vehicle 100 will be described below.

The processor of the vehicle 100 may detect external information through the object detection device 300 such as the camera 310, the radar 320, the lidar 330, the ultrasonic sensor 340, and the infrared sensor 350. The external information includes information about an obstacle around the vehicle 100.

In a first example, the external information may include information about an obstacle around the vehicle 100, detected through the object detection device 300. The information about the obstacle may include information about the type of the obstacle, the distance between the obstacle and the vehicle 100, and so on.

A condition triggering generation of an avoidance route in which a vehicle drives out of a learned driving route may be a second example of the external information. For example, the vehicle 100 may detect an obstacle which has not existed in a driving route during learning, through the object detection device 300 while driving along the learned driving route. The processor of the vehicle 100 may actively generate a route for avoiding the obstacle and continue driving along the generated route.

The processor of the vehicle 100 may receive user information about a remote device through the communication device 400. The user information may include information indicating whether a user is watching the remote device. The remote device refers to an external device capable of communicating with the vehicle 100, such as a mobile terminal.

In some implementations, a method of controlling an autonomous vehicle may be performed in a different manner depending on whether a user is watching a remote device, which will be described in detail with reference to FIGS. 11A and 11B.

Internal information about the vehicle 100 may be determined by the processor of the vehicle 100. That is, the processor of the vehicle 100 may determine basic information related to driving of the vehicle 100, such as a speed of the vehicle 100, a heading of the vehicle 100, and a rotation angle of the steering wheel, through at least one of the communication device 400, the maneuvering device 500, the vehicle drive device 600, or the operation system 700 illustrated in FIG. 7.

Further, the internal information about the vehicle 100 may include information about on/off of various functions that the vehicle 100 is capable of executing. For example, the internal information may include information about a driving mode supporting driving from the entrance of a parking lot to a parking slot, and information about a parking mode supporting parking in and pull-out from a parking slot.

Subsequently, the processor of the vehicle 100 change control of the vehicle 100 based on at least one of the afore-described external information about the vehicle 100, user information, or internal information about the vehicle 100 in step 830 of FIG. 8. Then, the processor of the vehicle 100 generates monitoring information by reflecting the changed control of the vehicle 100 in step 850 of FIG. 8. Finally, the processor of the vehicle 100 transmits the generated monitoring information to the remote device so that the remote device may display the monitoring information in step 870 of FIG. 8.

Steps 830 to 870 will be described below in detail in each implementation.

Figure 9A:
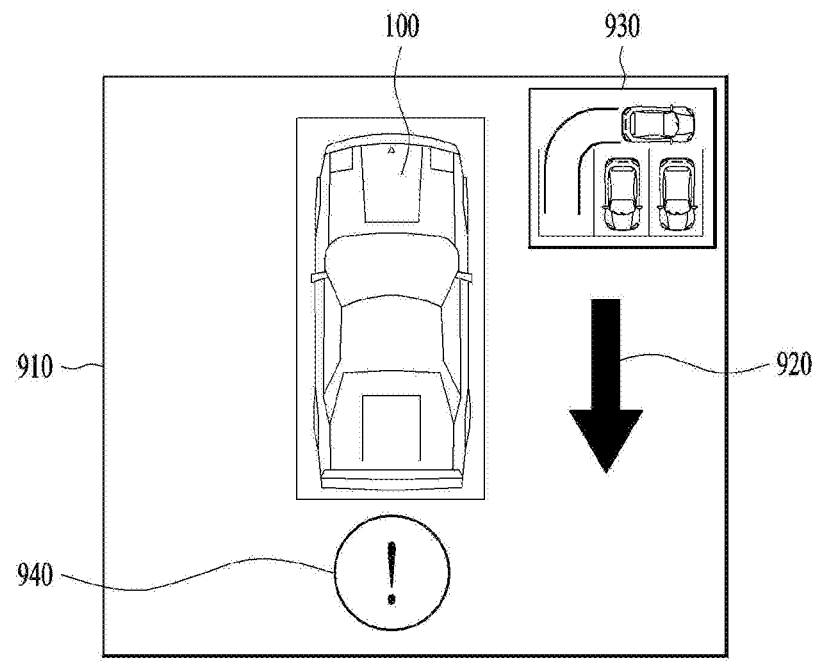
FIGS. 9A to 12 are views illustrating example methods for monitoring an example autonomous vehicle.
Figure 9B:
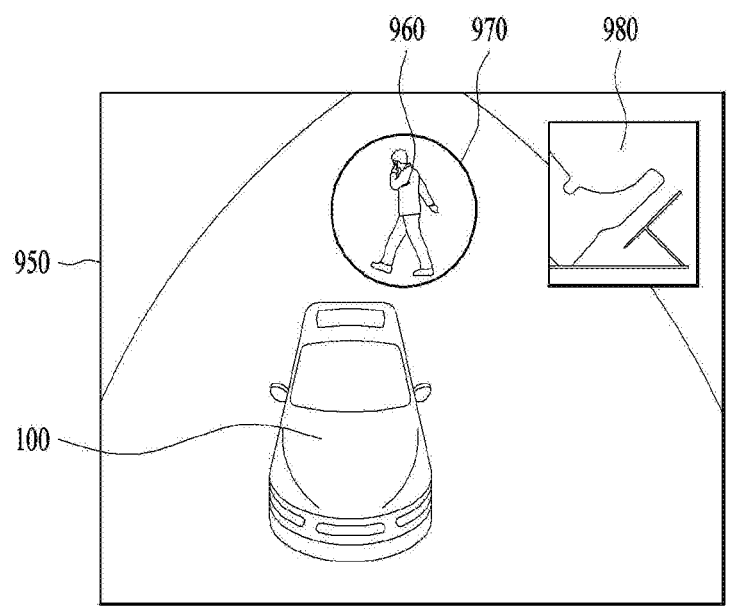

FIGS. 9A and 9B are views illustrating an example method of monitoring an autonomous vehicle according to another implementation of the present disclosure. Hereinbelow, it may be understood that the processor of the vehicle 100 is a component corresponding to the controller 170 illustrated in FIG. 7. Further, the vehicle 100 and the autonomous vehicle 100 may be understood as identical.

More specifically, FIGS. 9A and 9B illustrate monitoring information about the vehicle 100, which is output on a screen of a remote device.

Referring to FIG. 9A, monitoring information 910 may be configured by an around view monitor. The monitoring information 910 may include an image of the vehicle 100, an indicator 920 indicating a heading of the vehicle 100, and an indicator 930 indicating a current location and parking trace of the vehicle 100 in the vicinity of a parking slot. Further, if an obstacle outside the vehicle 100 is detected through the object detection device 300, the monitoring information 910 may include an alarm indicator 940.

If the implementation of step 810 in FIG. 8 is applied to FIGS. 9A and 9B, the processor of the vehicle 100 detects external information about the existence of an obstacle behind the vehicle 100 in a backward direction in which the vehicle 100 is driving.

Then, if the implementation of step 830 in FIG. 8 is applied to FIGS. 9A and 9B, the processor of the vehicle 100 changes control of the vehicle 100 based on the detected external information. In FIGS. 9A and 9B, auto emergency braking (AEB) corresponds to a control change of the vehicle 100.

Then, if the implementation of step 850 in FIG. 8 is applied to FIG. 9, the processor of the vehicle 100 generates monitoring information with a changed viewpoint or screen scale by reflecting the changed control (e.g., emergency braking) of the vehicle 100. The monitoring information reflecting the emergency braking may be as illustrated in FIG. 9B. That is, the processor of the vehicle 100 generates monitoring information 950 by changing a viewpoint or a screen scale so as to display an obstacle 960 detected behind the vehicle 100 on a monitoring screen, as illustrated in FIG. 9B, instead of the around view monitoring illustrated in FIG. 9A.

Then, if the implementation of step 870 in FIG. 8 is applied to FIGS. 9A and 9B, the processor of the vehicle 100 transmits the generated monitoring information 950 to the remote device. The monitoring information 950 may include the vehicle 100, the obstacle 960, an indicator 970 that enables the user to readily recognize the obstacle 960, and an indicator 980 indicating emergency braking.

In some implementations, the processor of the vehicle 100 generates monitoring information for which a viewpoint change speed, a viewpoint change time, or a screen scale change speed is controlled differently, based on at least one of the distance between the vehicle 100 and the obstacle 960, a deceleration time, or a deceleration amount.

That is, the processor of the vehicle 100 may change the viewpoint in different manners in the case where the processor of the vehicle 100 recognizes the obstacle 960 for a sufficient time and decelerates slowly, and in the case where the obstacle 960 abruptly appears and the processor of the vehicle 100 decelerates fast for a short time. For example, in the case where the processor of the vehicle 100 recognizes the obstacle 960 for a sufficient time and decelerates slowly, the processor of the vehicle 100 may be configured to longer maintain around view monitoring as illustrated in FIG. 9A. For this purpose, the processor of the vehicle 100 may preset parameters such as a distance to an obstacle, a deceleration time, and a deceleration amount.

As the autonomous vehicle 100 generates monitoring information reflecting changed control of the autonomous vehicle 100 based on detected external information, the autonomous vehicle 100 achieves the technical effect that the user may perceive the current situation of the autonomous vehicle 100 more rapidly through the remote device.

Figure 10:
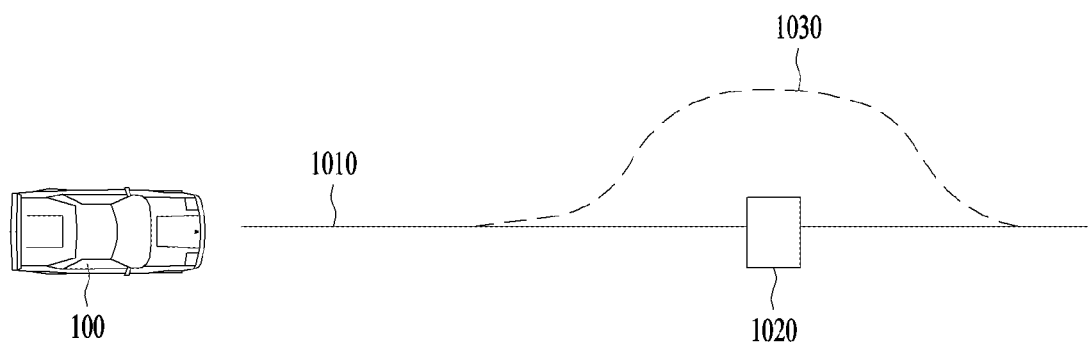

FIG. 10 is a view illustrating an example method of monitoring an autonomous vehicle according to another implementation of the present disclosure. Hereinbelow, it may be understood that the processor of the vehicle 100 is a component corresponding to the controller 170 illustrated in FIG. 7. Further, the vehicle 100 and the autonomous vehicle 100 may be understood as identical.

In some implementations, the autonomous vehicle 100 may detect an obstacle 1020, which did not exist in a driving route 1010 during learning, through the object detection device 300 while driving in the learned driving route 1010. Herein, the processor of the vehicle 100 may actively generate an avoidance route 1030 to avoid the obstacle 1020 and continue driving.

If the implementation of step 810 in FIG. 8 is applied to FIG. 10, the processor of the vehicle 100 detects external information about the existence of the obstacle 1020 behind the vehicle 100 in the learned driving route 1010.

Then, if the implementation of step 830 in FIG. 8 is applied to FIG. 10, the processor of the vehicle 100 changes control of the vehicle 100 based on the detected external information. In FIG. 10, in the presence of the obstacle 1020 in the driving route of the vehicle 100, the processor of the vehicle 100 generates the avoidance route 1030 and controls the vehicle 100 to drive along the generated avoidance route 1030, which corresponds to a control change.

Then, if the implementation of step 850 in FIG. 8 is applied to FIG. 10, the processor of the vehicle 100 generates monitoring information by reflecting the changed control of the vehicle 100 to cope with the obstacle 1020, that is, reflecting driving in the avoidance route 1030. Both of an image of the route prior to the generation of the avoidance route 1030, that is, the learned driving route 1010 and an image of the generated avoidance route 1030 may be displayed in the monitoring information which reflects driving in the avoidance route 1030.

Further, before the vehicle 100 enters the avoidance route 1030, the processor of the vehicle 100 may control generation of monitoring information with a screen configuration changed so as to display both of a point at which the avoidance route 1030 is branched from the learned driving route 1010 and a point at which the avoidance route 1030 joins the learned driving route 1010, and after the vehicle 100 enters the avoidance route 1030, the processor of the vehicle 100 may control generation of the monitoring information existing prior to the change. The monitoring information prior to the change may have a default screen scale and include a part of the learned driving route 1010 displayed within a screen range.

Then, if the implementation of step 870 in FIG. 8 is applied to FIG. 10, the processor of the vehicle 100 transmits the generated monitoring information to the remote device.

As the autonomous vehicle 100 generates monitoring information reflecting a control change of the vehicle 100 based on detected external information, the autonomous vehicle 100 achieves the technical effect that the user may perceive the current situation of the autonomous vehicle 100 more rapidly through the remote device.

Figure 11A:
Figure 11B:
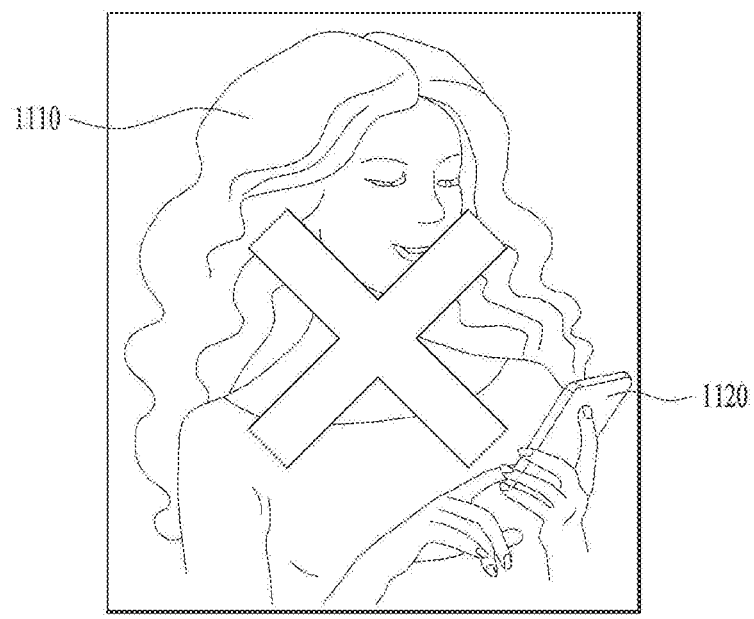

FIGS. 11A and 11B are views illustrating an example method of monitoring an autonomous vehicle according to another implementation of the present disclosure. Hereinbelow, it may be understood that the processor of the vehicle 100 is a component corresponding to the controller 170 illustrated in FIG. 7. Further, the vehicle 100 and the autonomous vehicle 100 may be understood as identical.

More specifically, FIG. 11A illustrates a case in which a user 1110 of a remote device 1120 is watching the remote device 1120, and FIG. 11B illustrates a case in which the user 1110 of the remote device 1120 is not watching the remote device 1120.

It may be determined whether the user 1110 is watching the remote device 1120 in various methods including image detection through a camera equipped in the remote device 1120, and tracking of the eyes of the user 1110.

In step 810 of FIG. 8, the processor of the vehicle 100 may receive user information from the remote device through the communication device 400. The user information is information indicating whether the user 1110 of the remote device 1120 is watching the remote device 1120.

For the convenience of description, user information indicating that the user 1110 is not watching the remote device 1120 is referred to as first information, and user information indicating that the user 1110 is watching the remote device 1120 is referred to as second information. That is, the processor of the vehicle 100 may receive one of the first information or the second information from the remote device 110 through the communication device 400.

Particularly, upon receipt of the first information through the communication device 400, which implies that the user 1110 is not monitoring the vehicle 100, the processor of the vehicle 100 controls an operation of the vehicle 100 more passively and more conservatively. Hereinbelow, various implementations of the present disclosure illustrated in FIGS. 11A and 11B will be described in detail.

In some implementations, upon receipt of the first information through the communication device 400, the processor of the vehicle 100 changes control of the vehicle 100 based on the received first information, so that the vehicle 100 may discontinue an operation at its current location.

For example, the processor of the vehicle 100 may control discontinuation or cancellation of driving or parking in progress at the current location of the vehicle 100. Further, the processor of the vehicle 100 may add or skip a step of transmitting an alarm message to the remote device 1120 depending on whether the vehicle 100 operates in the driving mode or the parking mode. Further, the processor of the vehicle 100 may generate monitoring information indicating that the vehicle 100 has discontinued driving or parking, and transmit the generated monitoring information to the remote device 1120.

In some implementations, a control method of executing one task by a plurality of functions is called cooperative control. If the concept of cooperative control is applied to control of an operation of the autonomous vehicle 100 through a remote device, it may be understood that the plurality of functions, that is, remote device-based user control and control of the processor of the vehicle 100 cooperatively perform driving and parking of the autonomous vehicle 100. That is, the processor of the vehicle 100 may further receive a control value to control an operation of the vehicle 100 from the remote device through the communication device 400. That is, the control value for controlling an operation of the vehicle 100, received from the remote device may be reflected in executing a function of the maneuvering device 500 including the steering input device 510, the acceleration input device 530, and the brake input device 570.

In some implementations, upon receipt of the first information through the communication device 400, the processor of the vehicle 100 may not reflect a control value input through the remote device 1120 by the user in control of the vehicle 100. That is, one of the two functions for cooperative control or user control through the remote device may be ignored.

In some implementations, if it is detected that the user 1110 is not watching the remote device 1120, a button related to control of the vehicle 100 may be designed to be deactivated on the remote device 1120. In this manner, the autonomous vehicle 100 achieves the technical effect that only when the user 1110 pays attention to monitoring of the vehicle 100, the user 1110 may affect control of the vehicle 100.

In some implementations, the processor of the vehicle 100 may be designed to further receive a first control value for controlling the speed of the vehicle 100 from the remote device 1120 through the communication device 400, calculate a second control value from the received first control value based on the screen scale of monitoring information, and control the vehicle 100 based on the calculated second control value. The control of the vehicle 100 includes control of the speed of the vehicle 100. That is, the screen scale of monitoring information may be linked to a user-input control value in an inverse proportion relationship.

For example, in spite of reception of the same first control value for increasing the speed of the vehicle 100, if the screen scale of monitoring information is small, the processor of the vehicle 100 may calculate a second control value to be 10 km/h, and if the screen scale of the monitoring information is large, the processor of the vehicle 100 may calculate the second control value to be 1 km/h. These values are merely exemplary, not limiting the scope of the present disclosure.

In some implementations, upon receipt of the first information through the communication device 400, the processor of the vehicle 100 may control the vehicle 100 to drive only in an existing learned route. In some implementations, in the presence of an obstacle in an existing learned route, the processor of the vehicle 100 may pull over the vehicle 100 not to collide with the obstacle and then await reception of a command from the user 1110 through the remote device 1120 without generating an avoidance route, unlike the implementation of FIG. 10.

In some implementations, the processor of the autonomous vehicle 100 may set different references based on which the vehicle 100 copes with an obstacle, for the case where the first information is received and the case where the second information is received.

For example, the processor of the autonomous vehicle 100 may set a higher reference for coping with an obstacle in the case of receiving the second information than in the case of receiving the first information. References for coping with an obstacle may include a distance for which the vehicle 100 pulls over to avoid collision with an obstacle, a timing for transmitting an alarm message to the remote device, and so on. That is, upon receipt of the first information, the processor of the vehicle 100 may control the vehicle 100 to pull over faster and transmit an alarm message including a vibration notification or the like to the remote device more rapidly. On the other hand, upon receipt of the second information, the processor of the vehicle 100 may simply highlight an obstacle on a monitoring screen, so that the user may readily recognize and cope with the obstacle.

In some implementations, the processor of the vehicle 100 may pull over the vehicle 100 and transmit an alarm message to the user 1110 through the remote device 1120 faster in the case of receiving the first information than in the case of receiving the second information, in order to avoid collision with an obstacle.

In some implementations, the processor of the vehicle 100 may decrease a maximum allowed speed for the vehicle 100 in the case of receiving the first information, compared to the case of receiving the second information. That is, the autonomous vehicle 100 achieves the technical effect that if the user 1110 does not pay attention to monitoring of the vehicle 100, the maximum allowed speed of the vehicle 100 is decreased, thus increasing safety.

Upon occurrence of collision between an obstacle and the vehicle 100, the processor of the vehicle 100 may store information about the collision time and user information received from the remote device at the collision time in the memory 140. Because it may be determined whether the user 1110 was watching the remote device 1120 at the collision time, referring to the information about the collision time and the user information stored in the memory 140, which one between a manufacturer and the user is responsible may be clarified.

The processor of the vehicle 100 may further receive information to be reflected in an operation of the autonomous vehicle 100 from at least one external device (e.g., an external server) through the communication device 400, and prioritize the remote device and the at least one external devices. Further, the priority levels of the remote device and the at least one external devices may be set differently according to the first or second information received from the remote device.

Upon receipt of the first information, the processor of the vehicle 100 prioritizes the external server and the processor of the vehicle 100 in this order. On the other hand, upon receipt of the second information, the processor of the vehicle 100 prioritizes a user input through the remote device 1120, the external server, and the processor of the vehicle 100 in this order.

In some implementations, the autonomous vehicle 100 achieves the technical effect that in the case where parking of the vehicle 100 is controllable through a server, the right to control the vehicle 100 may be distributed between the server and the user 1110 depending on whether the user 1110 is watching the remote device 1120.

In some implementations, upon receipt of the first information, the processor of the vehicle 100 may automatically select a target parking location according to a predetermined condition without receiving a user input through the remote device 1120. In some implementations, the autonomous vehicle 100 achieves the technical effect that even when the user 1110 is not watching the remote device 1120, the processor of the vehicle 100 may perform parking immediately.

In some implementations, upon receipt of the first information, the processor of the autonomous vehicle 100 may control the operating mode of the vehicle 100 not to switch from the driving mode to the parking mode (or from the parking mode to the driving mode). In some implementations, the autonomous vehicle 100 operates in the driving mode in a route from the entrance of a parking lot to a parking space, and in the parking mode during parking in the parking space. In some implementations, the processor of the autonomous vehicle 100 achieves the technical effect that only when the user 1110 is watching the remote device 1120, the processor of the autonomous vehicle 100 allows mode switching so that the control of the autonomous vehicle 100 may proceed to the next step.

In some implementations, upon receipt of the first information for a predetermined time or longer through the communication device 400, the processor of the autonomous vehicle 100 may control the vehicle 100 to pull over at a current location or return to a position at which the user 1110 has got off. To pull over the vehicle 100 at the current location, the processor of the autonomous vehicle 100 may adjust the state of the transmission to Park (P) by controlling the transmission drive unit 612.

In some implementations, the processor of the autonomous vehicle 100 may control the vehicle 100 to park in a parking slot determined as available at the current location, instead of a target parking slot set by the vehicle 100. In some implementations, the autonomous vehicle 100 achieves the effect that if it is detected that the user 1110 has not watched the remote device 1120 for a predetermined time or longer, the vehicle 100 fast copes with an incident or an emergency.

In some implementations, the processor of the autonomous vehicle 100 may set different voice data and visual data ratios in monitoring information to be transmitted to the remote device 1120, in the case of receiving the first information and the case of receiving the second information. That is, In some implementations, the processor of the autonomous vehicle 100 may set a ratio of voice data to be higher than a ratio of visual data in the case of receiving the first information, and set a ratio of visual data to be higher than a ratio of voice data in the case of receiving the second information.

In this regard, the processor of the autonomous vehicle 100 may further receive information about the current situation of the user, for example, information indicating whether the user is holding the remote device 1120 in the user's hand, or talking through the remote device 1120, and set different methods of feeding back information about an event occurred to the autonomous vehicle 100 to the remote device 1120 according to the information.

In some implementations, the processor of the autonomous vehicle 100 achieves the technical effect that the processor of the autonomous vehicle 100 generates monitoring information suitable for the current situation of the user 1110 and transmits the generated monitoring information to the remote device 1120.

In some implementations, upon receipt of the first information, the processor of the autonomous vehicle 100 may flicker a lamp by controlling the lamp drive unit 650 in order to indicate to the neighborhood of the vehicle 100 that the user 1110 of the vehicle 100 is not watching the remote device 1120.

In some implementations, a situation in which movement of each of first and second vehicles controlled remotely by first and second users, respectively is restricted by the other vehicle in a parking lot is assumed and described below.

A processor of the first vehicle may receive information indicating whether a second user is watching a second remote device from the second vehicle through the communication device 400. The information may be one of the afore-described first information or second information. The first vehicle may make up a move request list which may be requested to the second vehicle, based on the information received from the second vehicle.

If the first information is received from the second vehicle, the move request list includes a move request having low necessity for confirmation of the second user, such as simple move forward or move backward. On the other hand, if the second information is received from the second vehicle, the move request list includes a move request having high necessity for confirmation of the second user, such as a move request including steering wheel manipulation or a move request for movement to a location apart from a current location by a predetermined distance or longer.

In some implementations, the technical effect that a different move request list is made up to transmit a request to another vehicle, depending on whether a user of the other vehicle is watching a remote device may be expected.

In some implementations, the processor of the vehicle 100 may control parking or pull-out in response to a user input to a button (or a switch) provided in the remote device 1120 as well as the first information and second information indicating whether the user 1110 is watching the remote device 1120. For the convenience of description, a user input to a button (or a switch) provided in the remote device 1120 is referred to as a switch input. The processor of the vehicle 100 may receive information about the distance between the vehicle 100 and the remote device 1120 or the location of the user 1110 from the remote device 1120.

More specifically, the user 1110 having the remote device 1120 may be located within a predetermined distance from the vehicle 100, and monitor parking of the vehicle 100 with the naked eye as well as the user 1110 applies a switch input. For the convenience of description, monitoring of parking of the vehicle 100 with the naked eye as well as application of the switch input is referred to as a switch input monitoring mode. In some implementations, if the user 1110 is apart from the vehicle 100 by a predetermined distance or farther or moves in a direction opposite to the driving direction of the vehicle 100, or if it is impossible for the user 1110 to view the vehicle 100 with the naked eye due to an obstacle such as a wall, the processor of the vehicle 100 may switch from the switch input monitoring mode to a remote monitoring mode.

When the monitoring mode is switched from the switch input monitoring mode to the remote monitoring mode, there may be a predetermined buffer period. During the buffer period, the controller of the remote device 1120 may recognize that the user 1110 moves the user's eyes to the screen of the remote device 1120, while maintaining the switch input. Upon recognition of the eye movement, the processor of the vehicle 100 may switch to the remote monitoring mode even when it is not impossible for the user 1110 to view the vehicle 100.

Figure 12:
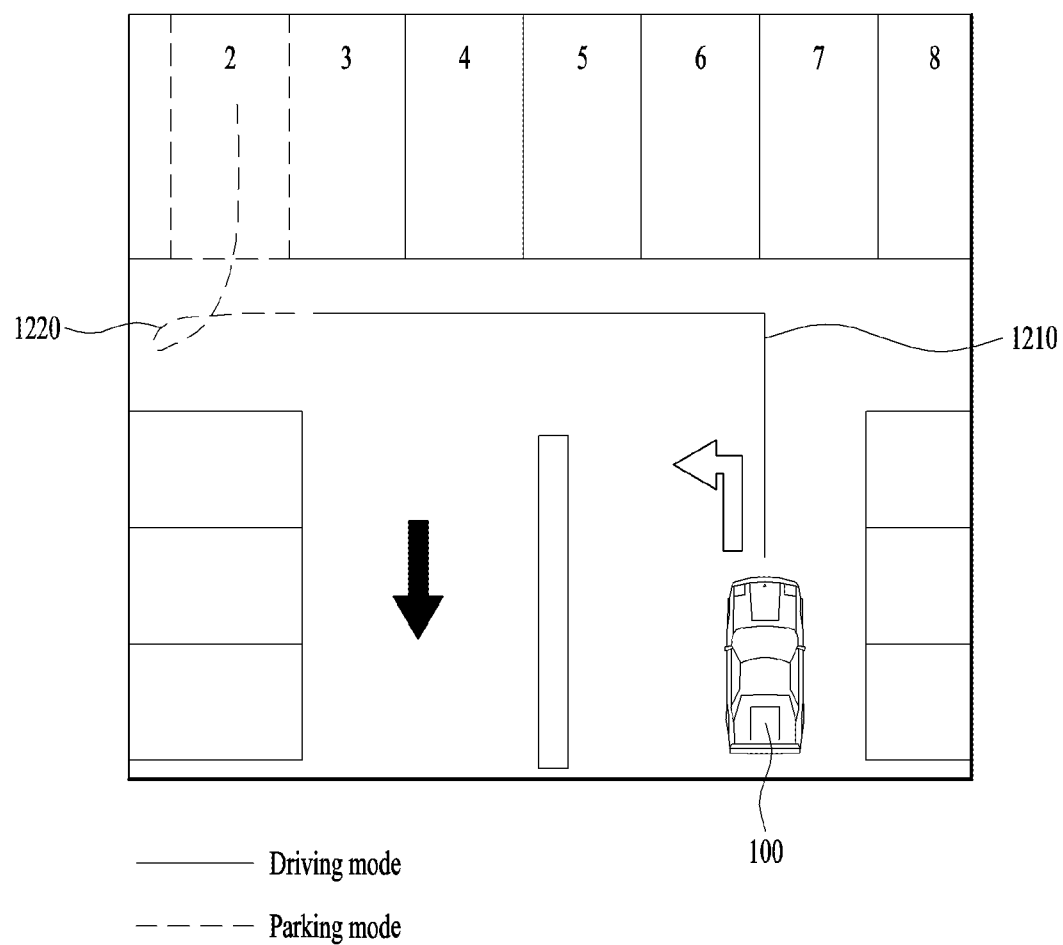

FIG. 12 is a view illustrating an example method of monitoring an autonomous vehicle. Hereinbelow, it may be understood that the processor of the vehicle 100 is a component corresponding to the controller 170 illustrated in FIG. 7. Further, the vehicle 100 and the autonomous vehicle 100 may be understood as identical.

More specifically, FIG. 12 illustrates movement of the autonomous vehicle 100 from the entrance of a parking lot to a final target location, parking slot 2.

The processor of the autonomous vehicle 100 may control the vehicle 100 to operate in the parking lot in one of the driving mode or the parking mode. The processor of the autonomous vehicle 100 may control the vehicle 100 to operate in the driving mode until the vehicle 100 leaves from the entrance of the parking lot and reaches the front of the parking slot, and to operate in the parking mode until the vehicle 100 is completely parked in the parking slot from the front of the parking slot.

The driving mode and the parking mode may differ in terms of the purpose of movement and the purpose of displaying monitoring information, as follows. That is, the driving mode aims at fast movement and detection of an obstacle in a driving route. On the other hand, the parking mode aims at accurate movement in the vicinity of a parking slot and detection of contact with an obstacle, which may occur during parking.

Accordingly, the processor of the autonomous vehicle 100 according to another implementation of the present disclosure may set different maximum allowed speeds for the autonomous vehicle 100 in the driving mode and the parking mode. For example, the processor of the autonomous vehicle 100 according to another implementation of the present disclosure may set a higher maximum allowed speed for the vehicle 100 in the driving mode than in the parking mode.

Further, the processor of the autonomous vehicle 100 according to another implementation of the present disclosure may set a larger screen scale in the parking mode than in the driving mode, so that the user may view more accurate information, which will be described below in detail with reference to FIGS. 13A to 19.

FIGS. 13A to 19 are views illustrating example outputs of an example autonomous vehicle displayed in a monitoring screen of a remote device. Hereinbelow, it may be understood that the processor of the vehicle 100 is a component corresponding to the controller 170 illustrated in FIG. 7. Further, the vehicle 100 and the autonomous vehicle 100 may be understood as identical.

Figure 13A:
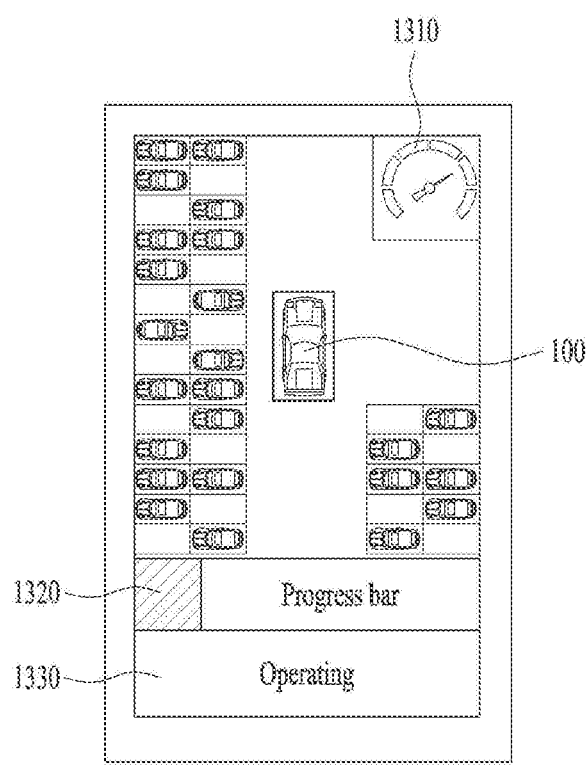
FIGS. 13A to 19 are views illustrating example outputs of an example autonomous vehicle displayed in a monitoring screen of a remote device.
Figure 13B:
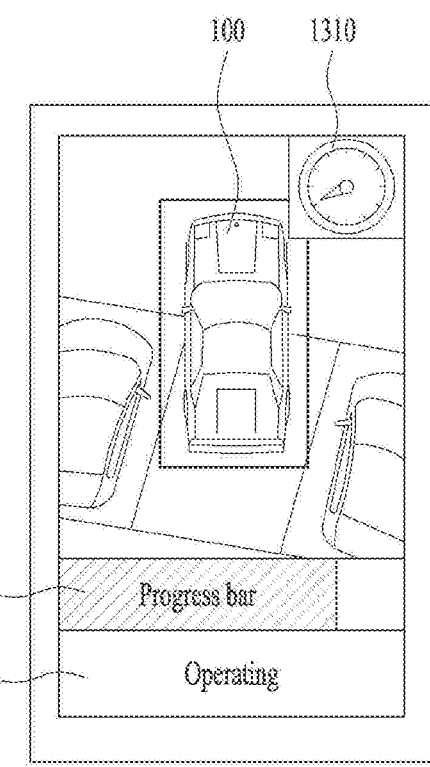

More specifically, FIG. 13A is a view illustrating an example monitoring screen output on the remote device, when the autonomous vehicle 100 operates in the driving mode. FIG. 13B is a view illustrating an example monitoring screen output on the remote device, when the autonomous vehicle 100 operates in the parking mode.

Referring to FIGS. 13A and 13B, the vehicle 100, an indicator 1310 indicating the current speed of the vehicle 100, a progress bar 1320 indicating the progress state of parking, and a button 1330 for transmitting a signal related to control of the vehicle 100 may be output on the screen of the remote device.

In step 810 of FIG. 8, the processor of the autonomous vehicle 100 may generate monitoring information on different screen scales in the driving mode and the parking mode. For example, if determining that the autonomous vehicle 100 is operating in the driving mode, the processor of the autonomous vehicle 100 may generate monitoring information on a small screen scale in the form of a bird-eye view, as illustrated in FIG. 13A.

In contrast, if determining that the autonomous vehicle 100 is operating in the parking mode, the processor of the autonomous vehicle 100 may generate monitoring information on a large screen scale so that the user may view detailed information around a parking slot, as illustrated in FIG. 13B.

In some implementations, even when the autonomous vehicle 100 is operating in the driving mode as illustrated in FIG. 13A, the screen scale of monitoring information may be controlled adaptively to the speed of the autonomous vehicle 100.

According to the implementation of the present disclosure illustrated in FIGS. 13A and 13B, since the processor of the autonomous vehicle 100 generates monitoring information on different screen scales according to operating modes, the technical effect that monitoring information suitable for the current situation of the vehicle 100 is provided to the remote device may be expected.

Figure 14:
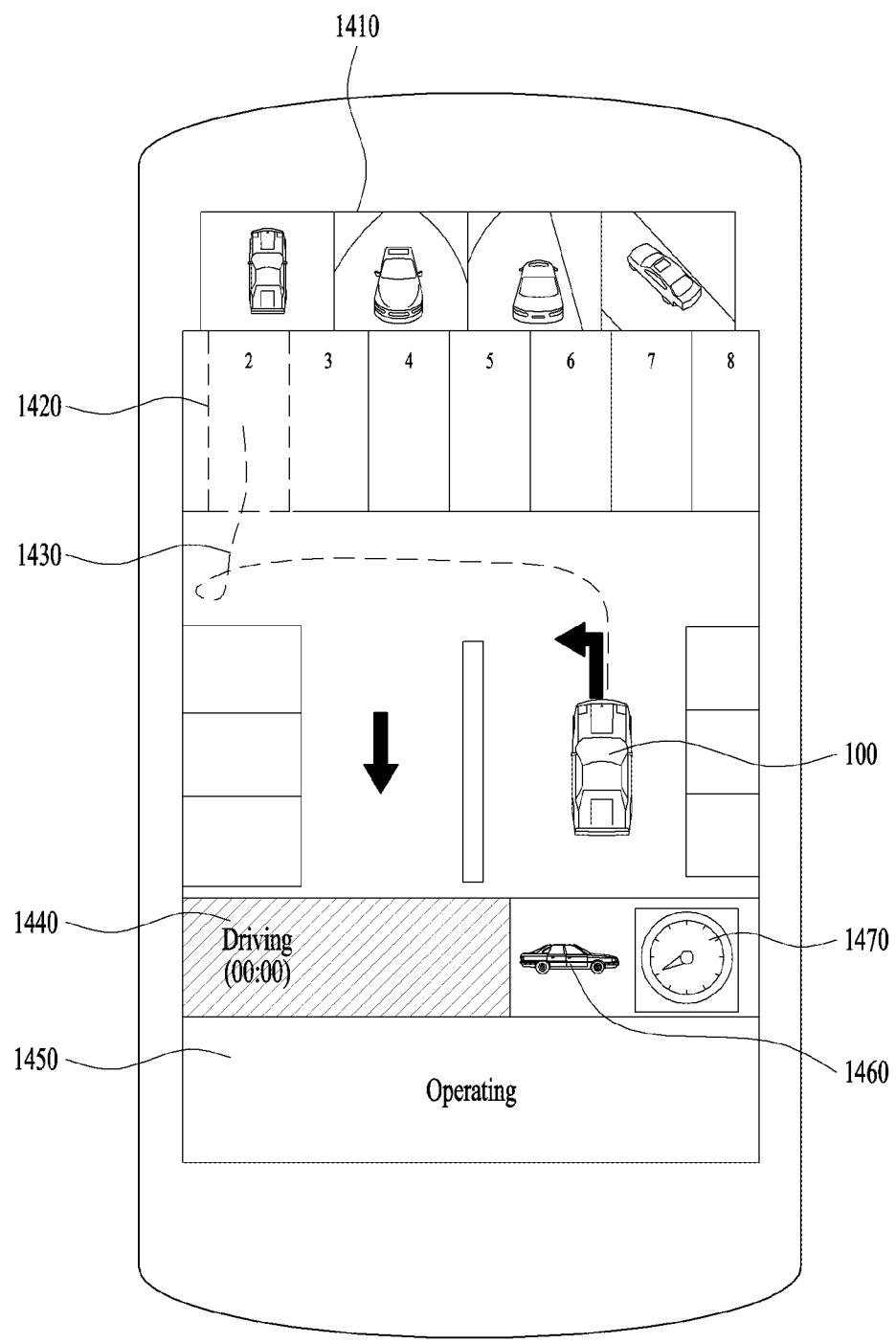
Figure 15:
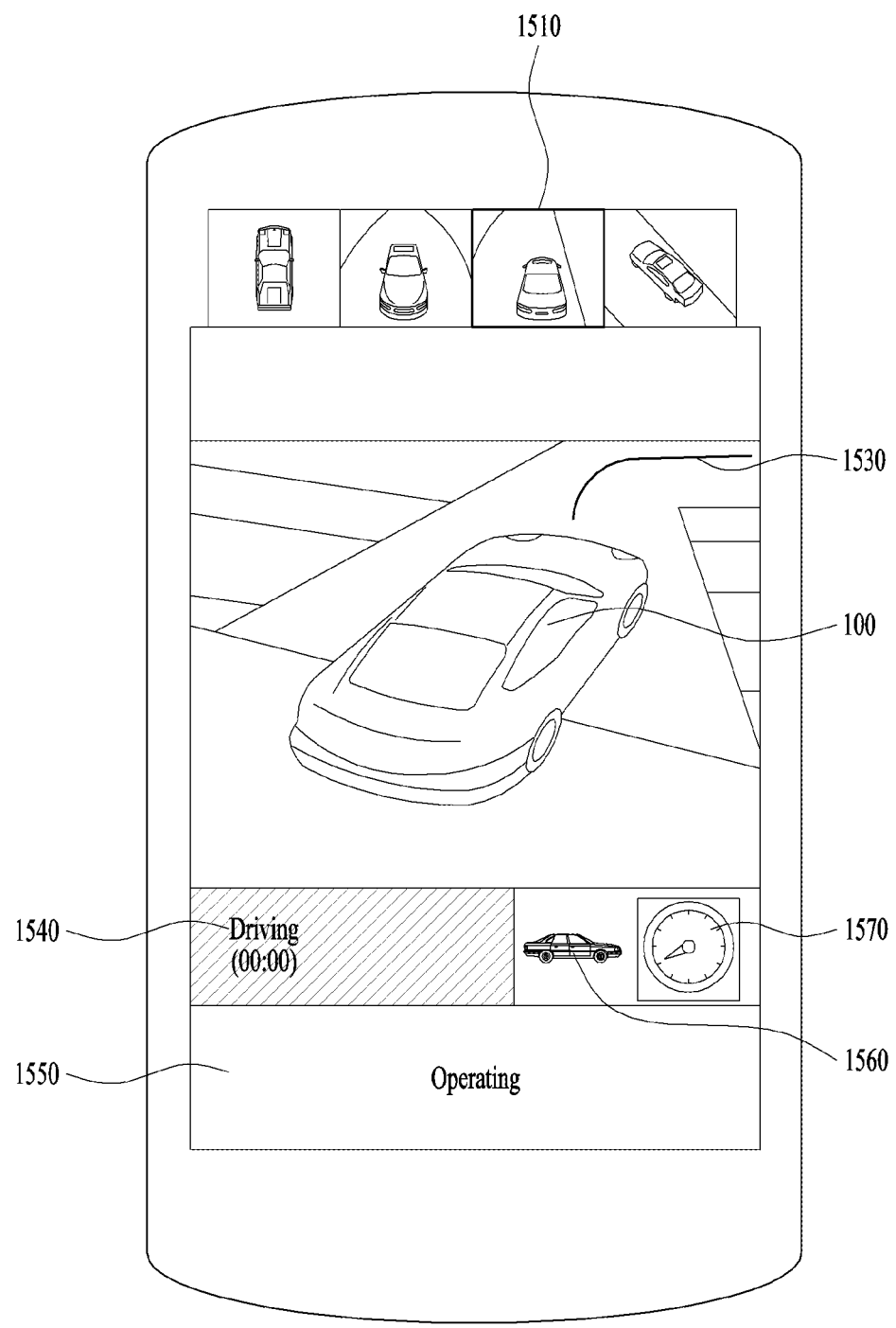
Figure 16:
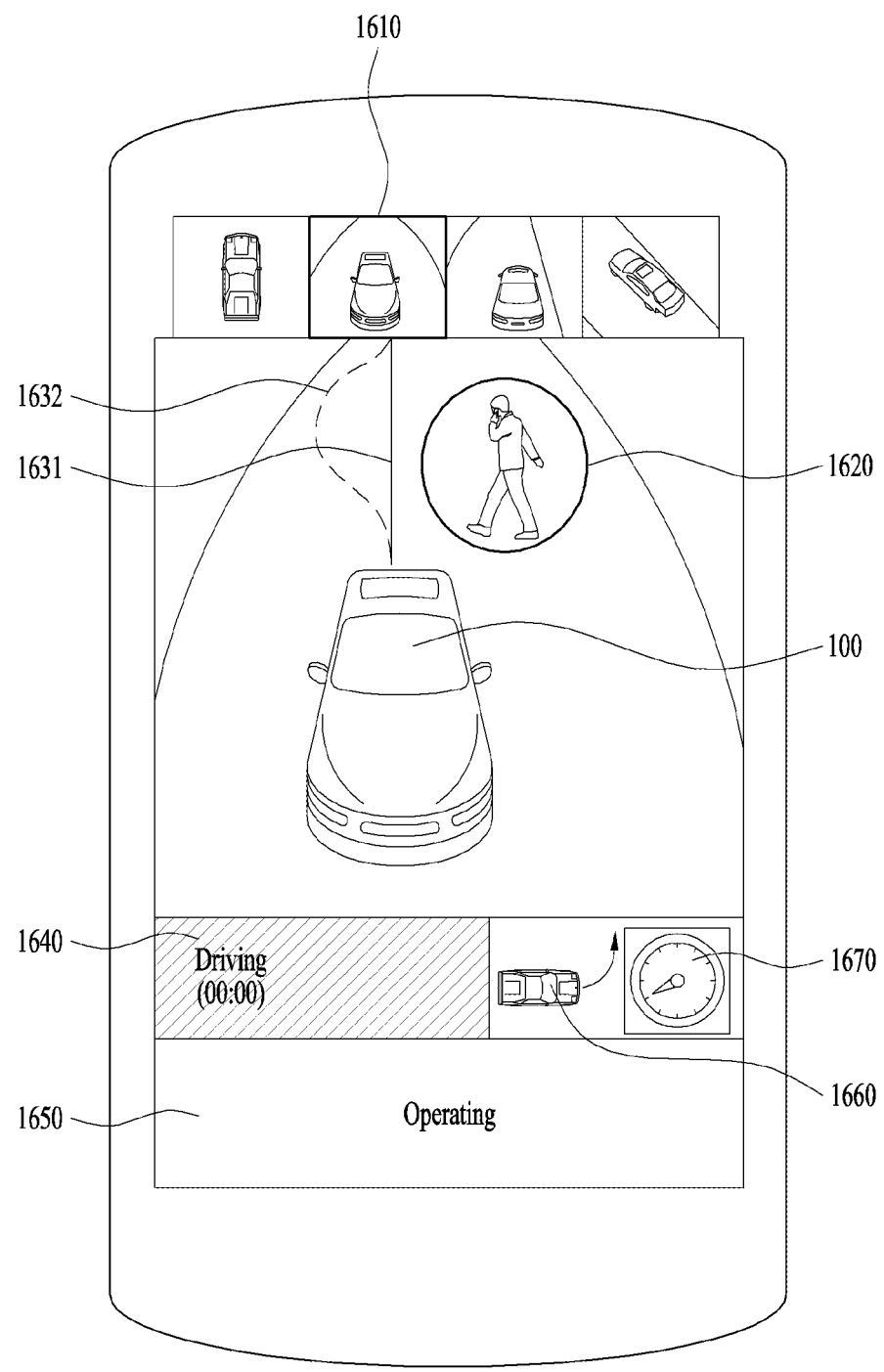

FIGS. 14, 15, and 16 are views illustrating examples of detailed monitoring information transmitted to a remote device in the driving mode.

FIG. 14 illustrates an example of initial monitoring information transmitted to the remote device, at the moment the autonomous vehicle 100 enters a parking lot and a driver gets off the vehicle 100. The current location of the vehicle 100, the location of a target parking slot 1420, and a total driving route to the target parking slot 1420 may be displayed in the monitoring information.

Further, an indicator 1440 indicating the current operating mode and progress time of the vehicle 100, a button 1450 for transmitting a signal related to control of the vehicle 100, an indicator 1460 indicating that the vehicle 100 is driving, an indicator 1470 indicating the speed of the vehicle 100, and real-time image information 1410 about the front, rear, and sides of the vehicle 100 may be output on the screen of the remote device.

In some implementations, it may be designed that the indicator 1440 indicates an expected arrival time at the target parking slot 1420, and the expected arrival time is changed in real time by reflecting an ambient environment change.

The processor of the autonomous vehicle 100 may further receive, from the remote device through the communication device 400, a signal requesting the autonomous vehicle 100 to start to move in the driving mode or parking mode. For example, upon receipt of a user input to the button 1450 from the remote device, the processor of the autonomous vehicle 100 may control the autonomous vehicle 100 to start to move in the driving mode. In this case, the processor of the autonomous vehicle 100 may generate first monitoring information including the current location of the vehicle 100, the location of a target parking slot, and a total driving route to the target parking slot, before receiving the signal requesting the vehicle 100 to start to move from the remote device through the communication device 400, and generate second monitoring information with a changed viewpoint and screen scale as illustrated in FIG. 15, after receiving the signal requesting the vehicle 100 to start to move. In some implementations, the user input to the button 1450 includes a continuously held input as well as one input.

As illustrated in FIG. 15, when the vehicle 100 starts to move in the driving mode, an indicator 1540 indicating an operating mode and an operating time, an indicator 1560 indicating the heading of the vehicle 100, an indicator 1570 indicating the speed of the vehicle 100, and a driving route 1530 of the vehicle 100 may be output.

FIG. 15 illustrates an example of selection of real-time image information 1510 about what is ahead of the vehicle 100 among the real-time image information 1410 of FIG. 14 by a user input. If real-time image information at a different angle is selected, a screen corresponding to the selected real-time image information may be output as illustrated in FIG. 15.

In some implementations, in step 810 of FIG. 8, if the processor of the autonomous vehicle 100 detects an obstacle through the object detection device 300, the screen of the remote device may be switched as illustrated in FIG. 16.

Upon detection of an obstacle 1620 blocking a driving route 1631 of the vehicle 100 during backing of the vehicle 100, the processor of the autonomous vehicle 100 may generate a route 1632 for avoiding the obstacle 1620 based on the detected information in step 830 of FIG. 8. In step 850 of FIG. 8, the processor of the autonomous vehicle 100 generates monitoring information by reflecting the changed control of the vehicle 100. Subsequently, the generated monitoring information is transmitted to the remote device and output as illustrated in FIG. 16 in step 870 of FIG. 8.

FIG. 16 will be described in greater detail. Real-time image information 1610 about what is behind the vehicle 100, an indicator 1640 indicating an operating mode and a progress time, a button 1650 for transmitting a signal related to control of the vehicle 100, an indicator 1660 indicating that the vehicle 100 is driving in the route for avoiding the obstacle 1620, and an indicator 1670 indicating the speed of the vehicle 100 may be output together on the screen of the remote device.

In some implementations, according to the implementation of the present disclosure illustrated in FIG. 16, the detected obstacle 1620 may be output highlighted so that the user may easily recognize the obstacle 1620.

On the other hand, according to the implementation of the present disclosure illustrated in FIG. 16, if no more obstacle is detected through the object detection device 300, the processor of the autonomous vehicle 100 may control the monitoring information illustrated in FIG. 15 to be output again on the remote device.

Figure 17:
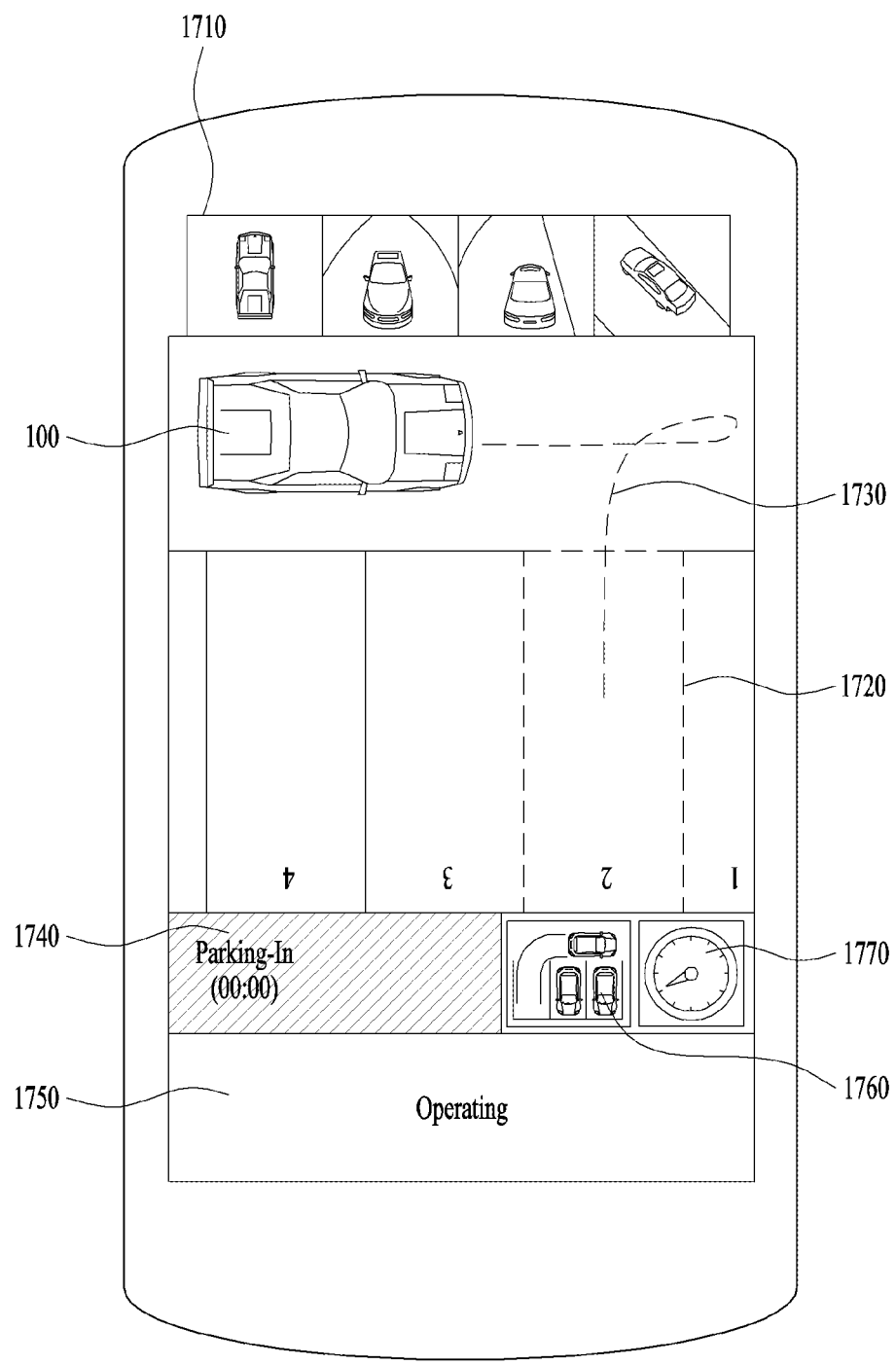
Figure 18:
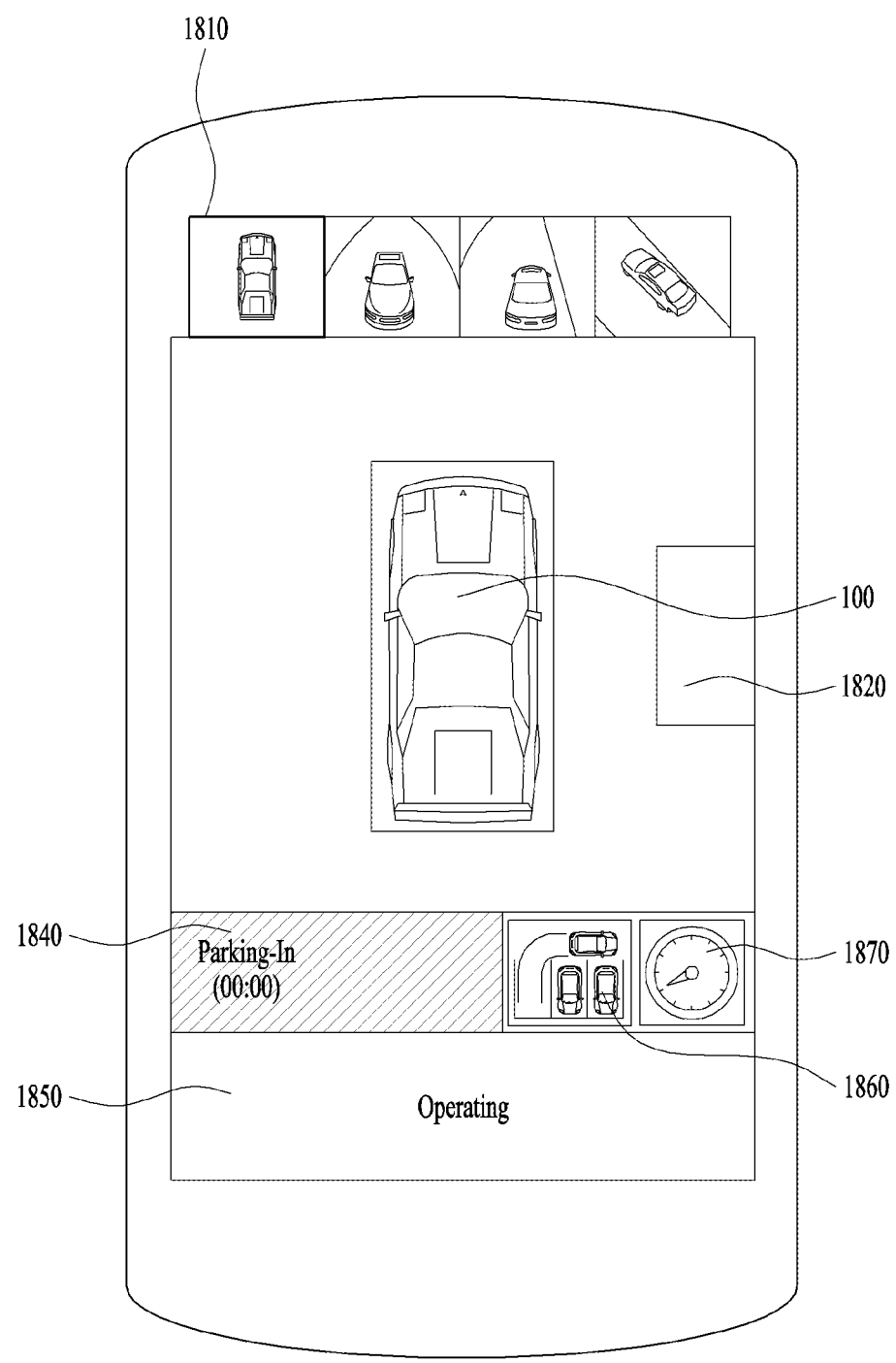
Figure 19:
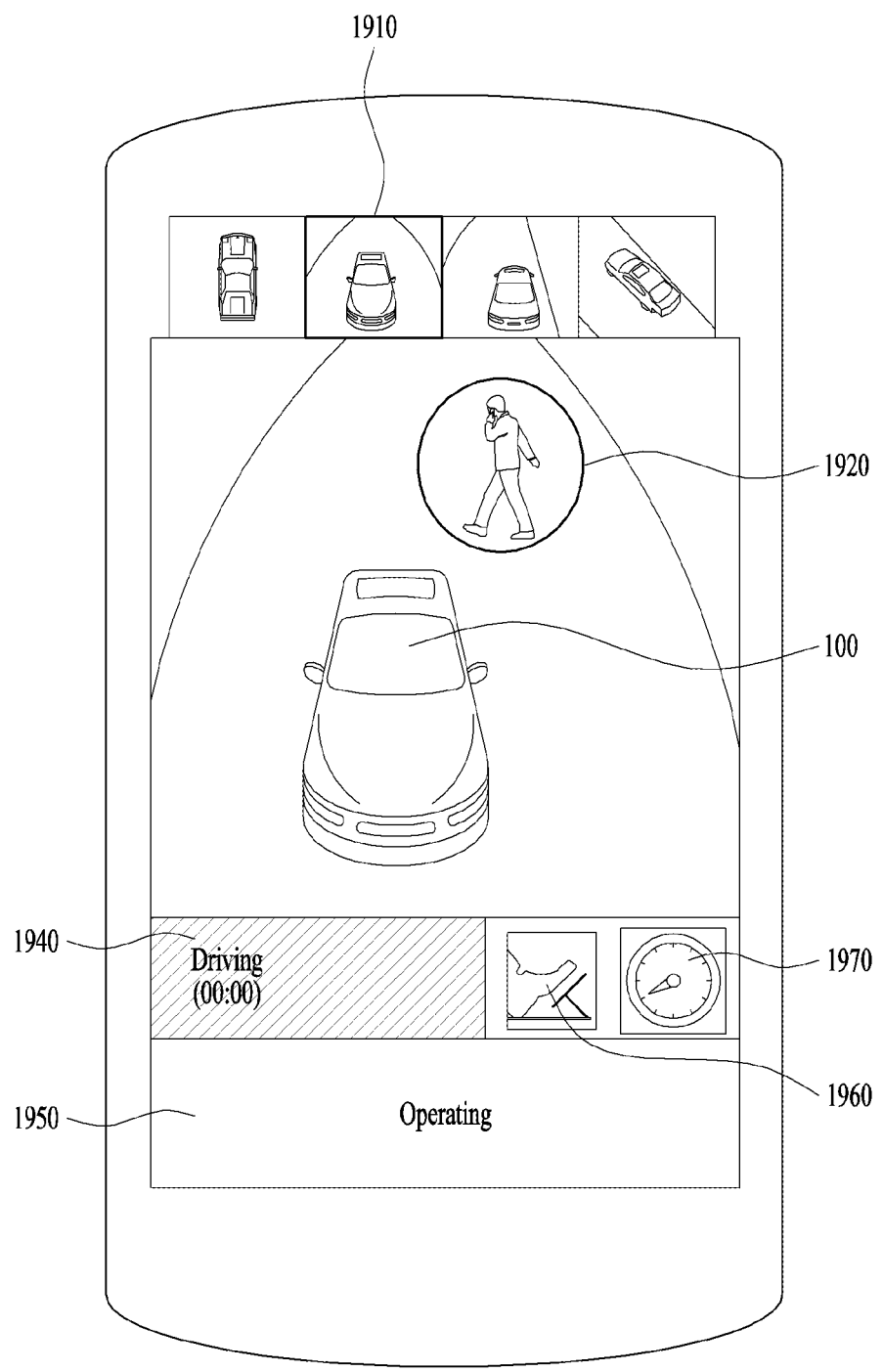

FIGS. 17, 18, and 19 are views illustrating examples of detailed monitoring information transmitted to the remote device in the parking mode.

FIG. 17 illustrates an example of monitoring information output on the remote device, when the vehicle 100 reaches the vicinity of a parking slot by driving to the parking slot in the driving mode according to the implementation illustrated in FIGS. 14, 15, and 16.

As in FIGS. 14, 15, and 16, an indicator 1740 indicating the current operating mode and progress time of the vehicle 100, a button 1750 for transmitting a signal related to control of the vehicle 100, an indicator 1760 indicating that the vehicle 100 is parking, an indicator 1770 indicating the speed of the vehicle 100, and real-time image information 1710 about the front, rear, and sides of the vehicle 100 may be output on the screen of the remote device.

Referring to FIG. 17, since the vehicle 100 is operating in the parking mode, a monitoring screen on a larger scale than the monitoring screen illustrated in FIG. 14 is output on the screen of the remote device. Further, referring to FIG. 17, information about the vehicle 100, a target parking slot 1720, and a parking trace 1730 to the target parking slot 1720 are also output together on the screen of the remote device.

Upon receipt of a user input to the button 1750 from the remote device, the processor of the autonomous vehicle 100 may control the autonomous vehicle 100 to start to move in the parking mode. In this case, the processor of the autonomous vehicle 100 may generate monitoring information having a changed viewpoint and screen scale as illustrated in FIG. 18. In some implementations, the user input to the button 1750 includes a continuously held input as well as one input.

As illustrated in FIG. 18, when the vehicle 100 starts to move in the parking mode, an indicator 1840 indicating the parking mode and a progress time, an indicator 1860 indicating that the vehicle 100 is parking, and an indicator 1870 indicating the speed of the vehicle 100 may be output together on the remote device.

Further, according to the implementation of the present disclosure illustrated in FIG. 18, since information about the vehicle 100, real-time image information 1810, and information about a target parking slot 1820 are output on the remote device, the technical effect that the user may view detailed information about the surroundings of the target parking slot 1820 is achieved.

In some implementations, in step 810 of FIG. 8, if the processor of the autonomous vehicle 100 detects an obstacle through the object detection device 300, the screen of the remote device may be switched as illustrated in FIG. 19.

Upon detection of an obstacle 1920 behind the vehicle 100 during parking, the processor of the autonomous vehicle 100 controls the vehicle 100 to stop based on the result of the detection in step 830 of FIG. 8. Further, in step 850 of FIG. 8, the processor of the autonomous vehicle 100 generates monitoring information by reflecting the changed control of the vehicle 100. Subsequently, the generated monitoring information is transmitted to the remote device and output as illustrated in FIG. 19 in step 870 of FIG. 19.

FIG. 19 will be described in greater detail. Real-time image information 1910 about what is behind the vehicle 100, an indicator 1940 indicating the parking mode and a progress time, a button 1950 for transmitting a signal related to control of the vehicle 100, an indicator 1960 indicating that the vehicle 100 has stopped temporarily or has emergency-braked, and an indicator 1970 indicating the speed of the vehicle 100 may be output together on the screen of the remote device.

In some implementations, according to the implementation of the present disclosure illustrated in FIG. 19, the detected obstacle 1920 may be output highlighted so that the user may easily recognize the obstacle 1920.

On the other hand, according to the implementation of the present disclosure illustrated in FIG. 19, if no more obstacle is detected through the object detection device 300, the processor of the autonomous vehicle 100 may control the monitoring information illustrated in FIG. 18 to be output again on the remote device.

As is apparent from the foregoing description, the implementations of the present disclosure have the following one or more effects.

First, in some implementations, since monitoring information is generated by reflecting changed control of the autonomous vehicle 100 based on detected external information, the technical effect that a user may fast recognize the current situation of the autonomous vehicle 100 through a remote device is achieved.

Secondly, in some implementations, since the autonomous vehicle is controlled in different manners when the user is watching the remote device and when the user is not watching the remote device, the technical effect that the autonomous vehicle is parked more safely is achieved.

The above-described present disclosure may be implemented as code that can be written on a computer-readable recording medium and thus read by a computer system. The computer-readable recording medium may be any type of recording device in which data is stored in a computer-readable manner. Examples of the computer-readable recording medium include a hard disk drive (HDD), a solid state disk (SSD), a silicon disk drive (SDD), a read only memory (ROM), a random access memory (RAM), a compact disk ROM (CD-ROM), a magnetic tape, a floppy disc, an optical data storage, and a carrier wave (e.g., data transmission over the Internet). The computer may include a processor or a controller. The above implementations are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

What is claimed is:

1. An autonomous vehicle comprising:
   an object detection device configured to detect external information about the autonomous vehicle, the external information including information about an obstacle around the autonomous vehicle detected through the object detection device;
   a communication device configured to receive user information from a remote device, the user information including one of (i) first information indicating that a user of the remote device is not watching the remote device, or (ii) second information indicating that the user of the remote device is watching the remote device; and
   one or more processors configured to:
      determine internal information about the autonomous vehicle,
      change control of the autonomous vehicle based on at least one of the external information, the user information, or the internal information,
      transmit, to the remote device, monitoring information corresponding to the changed control of the autonomous vehicle,
      change control of the autonomous vehicle to control the autonomous vehicle to avoid the obstacle,
      determine a viewpoint or a screen scale based on the changed control of the autonomous vehicle to control the autonomous vehicle to avoid the obstacle,
      generate the monitoring information including the viewpoint or the screen scale,
      receive a control value for controlling an operation of the autonomous vehicle from the remote device through the communication device,
      receive, from at least one external device through the communication device, information configured to control an operation of the autonomous vehicle,
      set priority levels of the remote device and the at least one external device, respectively, based on receiving the first information or the second information, and
      prioritize control of the autonomous vehicle based on the priority levels,
   wherein the priority levels are set differently based on whether the one or more processors receive the first information or the second information.

2. The autonomous vehicle according to claim 1, wherein the one or more processors are further configured to:
   determine at least one of a viewpoint change speed, a viewpoint change time, or a screen scale change speed based on at least one of a distance from the autonomous vehicle to the obstacle, a deceleration duration, or a deceleration amount; and
   generate the monitoring information that includes at least one of the viewpoint change speed, the viewpoint change time, or the screen scale change speed.

3. The autonomous vehicle according to claim 1, wherein the one or more processors are further configured to, based on the obstacle existing in a driving route of the autonomous vehicle:
   generate an avoidance route that allows the autonomous vehicle to avoid the obstacle; and
   generate the monitoring information including the avoidance route and the driving route to cause the avoidance route and the driving route to be displayed together on the remote device.

4. The autonomous vehicle according to claim 1, wherein the one or more processors are further configured to, in response to receipt of the first information through the communication device, change control of the autonomous vehicle based on the received first information to cease an operation of the autonomous vehicle at a current location of the autonomous vehicle.

5. The autonomous vehicle according to claim 1, wherein the one or more processors are further configured to, in response to receipt of the first information through the communication device, not apply the control value in control of the autonomous vehicle.

6. The autonomous vehicle according to claim 1, wherein the one or more processors are further configured to:
   in response to receipt of the first information, set a first reference to control the autonomous vehicle to avoid the obstacle; and
   in response to receipt of the second information, set a second reference to control the autonomous vehicle to avoid the obstacle, the second reference being different from the first reference.

7. The autonomous vehicle according to claim 1, wherein the one or more processors are further configured to, based on a collision between the autonomous vehicle and the obstacle, store, in a memory, information including a collision time and user information received from the remote device at the collision time.

8. The autonomous vehicle according to claim 1, wherein the one or more processors are further configured to, based on receiving the first information for a duration greater than or equal to a predetermined time through the communication device:
   control the autonomous vehicle to stop at a current location of the autonomous vehicle; or
   control the autonomous vehicle to return to a location from which the user has started the autonomous vehicle.

9. The autonomous vehicle according to claim 1, wherein the one or more processors are further configured to:
   receive a first value for controlling a speed of the autonomous vehicle from the remote device through the communication device;
   calculate a second control value from the received first control value based on a screen scale included in the monitoring information; and
   control the autonomous vehicle based on the calculated second control value.

10. The autonomous vehicle according to claim 9, wherein the one or more processors are further configured to:
    before receiving, from the remote device through the communication device, a signal requesting the autonomous vehicle to start to move, generate first monitoring information including a current location of the autonomous vehicle, a location of a target parking space, and a driving route from the current location of the autonomous vehicle to the target parking space; and
    after receiving, from the remote device through the communication device, the signal requesting the autonomous vehicle to start to move, generate second monitoring information including a viewpoint and a screen scale that are different from a viewpoint and a screen scale included in the first monitoring information.

11. The autonomous vehicle according to claim 1, wherein the internal information includes information about a driving mode configured to control driving of the autonomous vehicle in a parking lot, and information about a parking mode configured to control parking of the autonomous vehicle in a parking space and pulling-out of the autonomous vehicle from the parking space, and wherein the one or more processors are further configured to control the autonomous vehicle to operate in one of the driving mode or the parking mode.

12. A method of controlling an autonomous vehicle, the method comprising:

detecting external information about the autonomous vehicle, the external information including information about an obstacle around the autonomous vehicle;

receiving, through a communication device, user information from a remote device, the user information including one of (i) first information indicating that a user of the remote device is not watching the remote device, or (ii) second information indicating that the user of the remote device is watching the remote device;

determining internal information about the autonomous vehicle;

changing control of the autonomous vehicle based on at least one of the external information, the user information, or the internal information;

transmitting, to the remote device, monitoring information corresponding to the changed control of the autonomous vehicle;

changing control of the autonomous vehicle to control the autonomous vehicle to avoid the obstacle;

determining a viewpoint or a screen scale based on the changed control of the autonomous vehicle to control the autonomous vehicle to avoid the obstacle;

generating the monitoring information including the viewpoint or the screen scale;

receiving a control value for controlling an operation of the autonomous vehicle from the remote device through the communication device;

receiving, from at least one external device through the communication device, information configured to control an operation of the autonomous vehicle;

setting priority levels of the remote device and the at least one external device, respectively, based on receiving the first information or the second information; and prioritizing control of the autonomous vehicle based on the priority levels, wherein the priority levels are set differently based on whether the first information or the second information is received.

13. The method according to claim 12, further comprising:

in response to receipt of the first information, setting a first reference to control the autonomous vehicle to avoid the obstacle, and in response to receipt of the second information, setting a second reference to control the autonomous vehicle to avoid the obstacle, the second reference being different from the first reference.

14. The method according to claim 12, wherein the internal information includes information about a driving mode configured to control driving of the autonomous vehicle in a parking lot, and information about a parking mode configured to control parking of the autonomous vehicle in a parking space and pulling-out of the autonomous vehicle from the parking space, and wherein changing control of the autonomous vehicle comprises switching control of the autonomous vehicle between the driving mode and the parking mode.

15. An autonomous vehicle comprising:

an object detection device configured to detect external information about the autonomous vehicle;

a communication device configured to receive user information from a remote device; and one or more processors configured to:

determine internal information about the autonomous vehicle, change control of the autonomous vehicle based on at least one of the external information, the user information, or the internal information, transmit, to the remote device, monitoring information corresponding to the changed control of the autonomous vehicle, receive a first value for controlling a speed of the autonomous vehicle from the remote device through the communication device, calculate a second control value from the received first control value based on a screen scale included in the monitoring information, control the autonomous vehicle based on the calculated second control value, before receiving, from the remote device through the communication device, a signal requesting the autonomous vehicle to start to move, generate first monitoring information including a current location of the autonomous vehicle, a location of a target parking space, and a driving route from the current location of the autonomous vehicle to the target parking space, and after receiving, from the remote device through the communication device, the signal requesting the autonomous vehicle to start to move, generate second monitoring information including a viewpoint and a screen scale that are different from a viewpoint and a screen scale included in the first monitoring information.

* * * * *